(12) United States Patent
Uesaka et al.

(10) Patent No.: US 12,342,404 B2
(45) Date of Patent: Jun. 24, 2025

(54) BEAM FAILURE RECOVERY IN MULTI-CELL CONFIGURATION

(71) Applicant: Telefonaktiebolaget LM Ericsson (publ), Stockholm (SE)

(72) Inventors: Kazuyoshi Uesaka, Kanagawa (JP); Muhammad Ali Kazmi, Sundbyberg (SE); Santhan Thangarasa, Vällingby (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 325 days.

(21) Appl. No.: 17/911,504

(22) PCT Filed: Apr. 12, 2021

(86) PCT No.: PCT/SE2021/050331
§ 371 (c)(1),
(2) Date: Sep. 14, 2022

(87) PCT Pub. No.: WO2021/206625
PCT Pub. Date: Oct. 14, 2021

(65) Prior Publication Data
US 2023/0354453 A1    Nov. 2, 2023

Related U.S. Application Data

(60) Provisional application No. 63/008,539, filed on Apr. 10, 2020.

(51) Int. Cl.
*H04W 76/19* (2018.01)
*H04W 72/1268* (2023.01)
(52) U.S. Cl.
CPC ....... *H04W 76/19* (2018.02); *H04W 72/1268* (2013.01)

(58) Field of Classification Search
CPC ............. H04W 76/19; H04W 72/1268; H04W 76/15
See application file for complete search history.

(56) References Cited

U.S. PATENT DOCUMENTS

2020/0059285 A1\* 2/2020 Zhang ................... H04W 16/28
2020/0350974 A1\* 11/2020 Kim ..................... H04W 72/046
(Continued)

FOREIGN PATENT DOCUMENTS

| WO | 2019213846 A1 | 11/2019 |
| WO | 2020031350 A1 | 2/2020 |
| WO | 2020033406 A2 | 2/2020 |

OTHER PUBLICATIONS

"3GPP TS 23.501 V17.0.0", 3rd Generation Partnership Project; Technical Specification Group Services and System Aspects; System architecture for the 5G System (5GS); Stage 2 (Release 17), Mar. 2021, pp. 1-489.

(Continued)

*Primary Examiner* — Kan Yuen
(74) *Attorney, Agent, or Firm* — Murphy, Bilak & Homiller, PLLC

(57) ABSTRACT

Method for a user equipment, UE), to communicate with a wireless network via multiple cells. The method includes detecting (1210) failure of a first beam associated with a first cell of the plurality of cells and determining (1230) availability or unavailability of other beams, than the first beam, that are associated with the first cell. The method further includes transmitting (1280), to one of the multiple cells, a message indicating availability or unavailability of the other beams associated with the first cell. The message is transmitted within a first duration (1220) after detecting the failure of the first beam, the first duration based on a maximum time for determining availability of the other beams and on a periodicity of resources allocated for beam failure reporting in the cell where the message is transmitted.

(Continued)

Other embodiments include complementary method for a network node, UE and network node configured to perform such method.

21 Claims, 9 Drawing Sheets

(56) References Cited

U.S. PATENT DOCUMENTS

| | | | |
|---|---|---|---|
| 2020/0374853 A1* | 11/2020 | Guan | H04W 24/08 |
| 2020/0374960 A1* | 11/2020 | Deenoo | H04W 76/19 |
| 2022/0104300 A1* | 3/2022 | Ramachandra | H04W 52/36 |
| 2022/0361275 A1* | 11/2022 | Da Silva | H04W 76/18 |
| 2024/0237053 A1* | 7/2024 | Tsai | H04W 72/569 |

OTHER PUBLICATIONS

"3GPP TS 38.133 V16.2.0", 3rd Generation Partnership Project; Technical Specification Group Radio Access Network; NR; Requirements for support of radio resource management (Release 16), Dec. 2019, pp. 1-1129.

"3GPP TS 38.133 V16.3.0", 3rd Generation Partnership Project; Technical Specification Group Radio Access Network; NR; Requirements for support of radio resource management (Release 16), Mar. 2020, pp. 1-1169.

"3GPP TS 38.211 V16.1.0", 3rd Generation Partnership Project; Technical Specification Group Radio Access Network; NR; Physical channels and modulation (Release 16), Mar. 2020, pp. 1-130.

"3GPP TS 38.321 V16.0.0", 3rd Generation Partnership Project; Technical Specification Group Radio Access Network; NR; Medium Access Control (MAC) protocol specification (Release 16), Mar. 2020, pp. 1-141.

* cited by examiner

BEAM FAILURE RECOVERY IN MULTI-CELL CONFIGURATION

TECHNICAL FIELD

Embodiments of the present disclosure generally relate to wireless networks, and particularly relate to improving the management of beams used for communication between wireless networks and wireless devices (or user equipment) operating in wireless networks.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink (DL), and on Single-Carrier Frequency Division Multiple Access (SC-FDMA) with a cyclic prefix in the uplink (UL). To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 0.5-ms slots. A 1-ms subframe includes two consecutive slots, each of which includes $N^{DL}_{symb}$ OFDM symbols comprised of $N_{sc}$ OFDM subcarriers. Similarly, each UL slot consists of $N^{UL}_{symb}$ OFDM symbols, each of which includes $N_{sc}$ OFDM subcarriers. A combination of a particular subcarrier in a particular symbol is known as a resource element (RE).

The LTE PHY maps various DL and UL physical channels to the resources described above. In general, a physical channel corresponds to a set of REs carrying information that originates from higher layers. Within the LTE DL and UL, certain REs within each LTE subframe are reserved for the transmission of reference signals. DL demodulation reference signals (DM-RS) are transmitted to aid the UE in the reception of an associated physical channel (e.g., PDCCH or PDSCH). Other DL reference signals include cell-specific reference signals (CRS), positioning reference signals (PRS), and CSI reference signals (CSI-RS). Other RS-like DL signals include Primary Synchronization Sequence (PSS) and Secondary Synchronization Sequence (SSS), which facilitate the UEs time and frequency synchronization and acquisition of system parameters (e.g., via PBCH). UL reference signals include DM-RS that are transmitted to aid the eNB in the reception of an associated physical channel (e.g., PUCCH or PUSCH); and sounding reference signals (SRS), which are not associated with any uplink channel.

LTE Release 10 (Rel-10) supports bandwidths larger than 20 MHz, with backward compatibility with LTE Rel-8. As such, a wideband LTE Rel-10 carrier (e.g., wider than 20 MHz) should appear as a number of component carriers (CCs) to an LTE Rel-8 ("legacy") terminal. This technique is generally referred to as Carrier Aggregation (CA). A dual connectivity (DC) framework was introduced in LTE Rel-12. DC refers to a mode of operation in which a UE, in RRC_CONNECTED state, consumes radio resources provided by at least two different network nodes (or points) connected to one another with a non-ideal backhaul. In LTE, these two network nodes are referred to as master eNB (MeNB) and secondary eNB (SeNB) but can be referred to more generally as master node (MN) and secondary node (SN), respectively.

In DC, a UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PCell of the SCG (also referred to as "primary SCG cell" or "PSCell") depending on whether the UE's MAC entity is associated with the MCG or the SCG, respectively. In non-DC operation (e.g., CA), SpCell refers to the PCell. An SpCell is always activated and supports PUCCH transmission and contention-based random access by UEs.

Fifth-generation NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE with some properties similar to a "suspended" condition in LTE. NR also includes new DC variants, including multi-RAT (MR) DC involving one connection to a NR node (e.g., gNB) and a second connection to an eNB.

In addition to providing coverage via cells, as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

In NR, beam management is used to maintain beam connections between network and UE for transmission and reception. At a high level, beam management includes procedures for beam establishment, beam failure recovery, and beam indication. Beam establishment involves the UE selecting the best (e.g., strongest) beam when it connects to the network. Beam failure recovery involves a UE changing to a different beam in the same cell when the current beam becomes too weak due to the channel condition changes, e.g., UE location change and/or rotation. Beam indication is used by the UE to report current beam conditions to the network.

In NR Rel-15, beam management is only supported on PCells and PSCells, with support for beam management in SCells under consideration for NR Rel-16. Some SCells may only support DL reception of channels/signals but other SCells may support both DL reception and UL transmission. This variation in SCell configuration and/or capabilities can create various problems, issues, and/or difficulties for beam management.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some embodiments of the present disclosure include methods (e.g., procedures) for a UE configured for communication via a plurality of cells in a wireless network.

These exemplary methods can include detecting failure of a first beam associated with a first cell of the plurality of cells. These exemplary methods can also include determining availability of other beams, than the first beam, that are associated with the first cell. These exemplary methods can also include transmitting, to one of the plurality of cells, a message indicating availability or non-availability of the other beams associated with the first cell. The message is transmitted within a first duration after detecting the failure of the first beam. The first duration can be based on a maximum time for determining availability of the other beams and on a periodicity of resources allocated for beam failure reporting in the cell in which the message is transmitted.

In some embodiments, the first duration can be further based on:
  UE capabilities to operate using independent or common beams for the first cell and other cells of the plurality of cells; and
  differences in carrier frequencies between the first cell and other cells of the plurality of cells.

In some embodiments, determining availability or unavailability can include various operations including: measuring signal strengths for the respective other beams; determining availability based on a measured signal strength for at least one of the other beams being above a predetermined threshold; and determining unavailability based on respective measured signal strengths for all other beams being below the predetermined threshold.

In some embodiments, these exemplary methods can also include, upon detecting failure of the first beam, initiating a timer with a maximum time for determining availability of the other beams. In such embodiments, determining availability or unavailability can include determining unavailability based on expiration of the timer before determining availability of the other beams.

In some embodiments, these exemplary methods can also include, based on determining availability of other beams, selecting a second beam of the other beams based on signal strength measured by the UE. In such embodiments, the transmitted message can indicate the second beam.

In some of these embodiments, the first cell is a PCell or a PSCell and the message is transmitted, in the first cell, as a random-access (RA) preamble using RA resources that correspond to the selected second beam.

In some of these embodiments, these exemplary methods can also include, based on determining unavailability of other beams, performing a cell reselection procedure to select a third beam of the other beams. In such embodiments, the message can be transmitted, in the first cell, as a RA preamble using RA resources that correspond to the third beam.

In some of these embodiments, the first duration is based on periodicity of the RA resources corresponding to the second beam or to the third beam, i.e., depending on whether availability or unavailability was determined.

In other embodiments, the first cell is an SCell and the message is transmitted as a medium access control (MAC) message via a cell other than the first cell. In particular, the other cell is a PCell or a PSCell.

In some of these embodiments, these exemplary methods can also include transmitting a scheduling request (SR) using resources allocated for beam failure reporting and, in response to the SR, receiving a grant of UL resources for transmitting the message. In such embodiments, the first duration is based on periodicity of the resources allocated for SR associated with beam failure recovery.

In some of these embodiments, these exemplary methods can also include, based on determining unavailability of other beams and after sending the message, refraining from (i.e., not performing) one or more operations with respect to the SCell to reduce UE energy consumption and/or UL interference. In some embodiments, the UE can refrain from the one or more operations for a second duration that is configured by the wireless network. In various embodiments, the one or more operations can include any of the following:
  monitoring at least one DL signal or channel associated with the first cell;
  monitoring all DL signals or channels associated with the first cell;
  transmitting at least one UL signal or channel associated with the first cell; and
  transmitting all UL signals or channels associated with the first cell.

Other embodiments include methods (e.g., procedures) for communicating with a UE via beams associated with a plurality of cells in a wireless network. These exemplary methods can be performed by one or more network nodes (e.g., base station, eNB, gNB, en-gNB, etc., or component thereof) in the wireless network (e.g., E-UTRAN, NG-RAN).

These exemplary methods can include transmitting a first beam associated with a first cell of the plurality of cells. These exemplary methods can also include receiving, from the UE via one of the plurality of cells, a message indicating availability or non-availability of the other beams associated with the first cell. The message can be received within a first duration after the UE detects failure of the first beam. The first duration can be based on a maximum time for determining availability of the other beams and on a periodicity of resources allocated for beam failure reporting in the cell in which the message is received.

In some embodiments, the first duration can be further based on:
  UE capabilities to operate using independent or common beams for the first cell and other cells of the plurality of cells; and
  differences in carrier frequencies between the first cell and other cells of the plurality of cells.

In some embodiments, these exemplary methods can also include configuring the UE with one or more of the following:
  a timer initiation value corresponding to a maximum time for determining availability of other beams after detecting a beam failure; and
  a signal strength threshold for determining availability of other beams after detecting a beam failure.

In some embodiments, the first cell is a PCell or a PSCell. When the message indicates availability, the message indicates a second beam, of the plurality of beams, that was selected by the UE, and the message is received, in the first cell, as a RA preamble using RA resources corresponding to the second beam.

In some of these embodiments, when the message indicates unavailability, the message indicates a third beam, of the plurality of beams, that was selected by the UE and the message is received, in the first cell, as a RA preamble using RA resources that correspond to the third beam.

In some of these embodiments, the first duration is based on periodicity of the RA resources corresponding to the second beam or to the third beam, i.e., depending on whether availability or unavailability was indicated by the message.

In other embodiments, the first cell is an SCell and the message is received as a MAC message via a cell other than the first cell. In particular, the other cell is a PCell or a PSCell.

In some of these embodiments, these exemplary methods can also include receiving a scheduling request (SR), from the UE, in resources allocated for beam failure reporting; and transmitting, to the UE in response to the SR, a grant of UL resources for transmitting the message. In some of these embodiments, the first duration is based on periodicity of the resources allocated for SR associated with beam failure recovery.

In some of these embodiments, when the message indicates availability of other beams, the message also indicates a second beam, of the plurality of beams, that was selected by the UE. In other embodiments, the message indicates that no other beam is available.

In some embodiments, a single network node transmits the first beam and receives the message. In other embodiments, a first network node transmits the first beam and a second network node receives the message.

Other embodiments include UEs (e.g., wireless devices, IoT devices, or components thereof, such as a modem) and network nodes (e.g., base stations, eNBs, gNBs, en-gNBs, etc., or components thereof) configured to perform operations corresponding to any of the exemplary methods described herein. Other exemplary embodiments include non-transitory, computer-readable media storing program instructions that, when executed by processing circuitry, configure such UEs or network nodes to perform operations corresponding to any of the exemplary methods described herein.

These and other embodiments described herein can reduce, mitigate, and/or eliminate ambiguity in UE behavior for beam failure detection and/or recovery procedures on SCells, PCells, or PSCells. Additionally, embodiments can reduce, mitigate, and/or eliminate interruptions to UE services due to beam failures.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes

DETAILED DESCRIPTION

Figure 1:
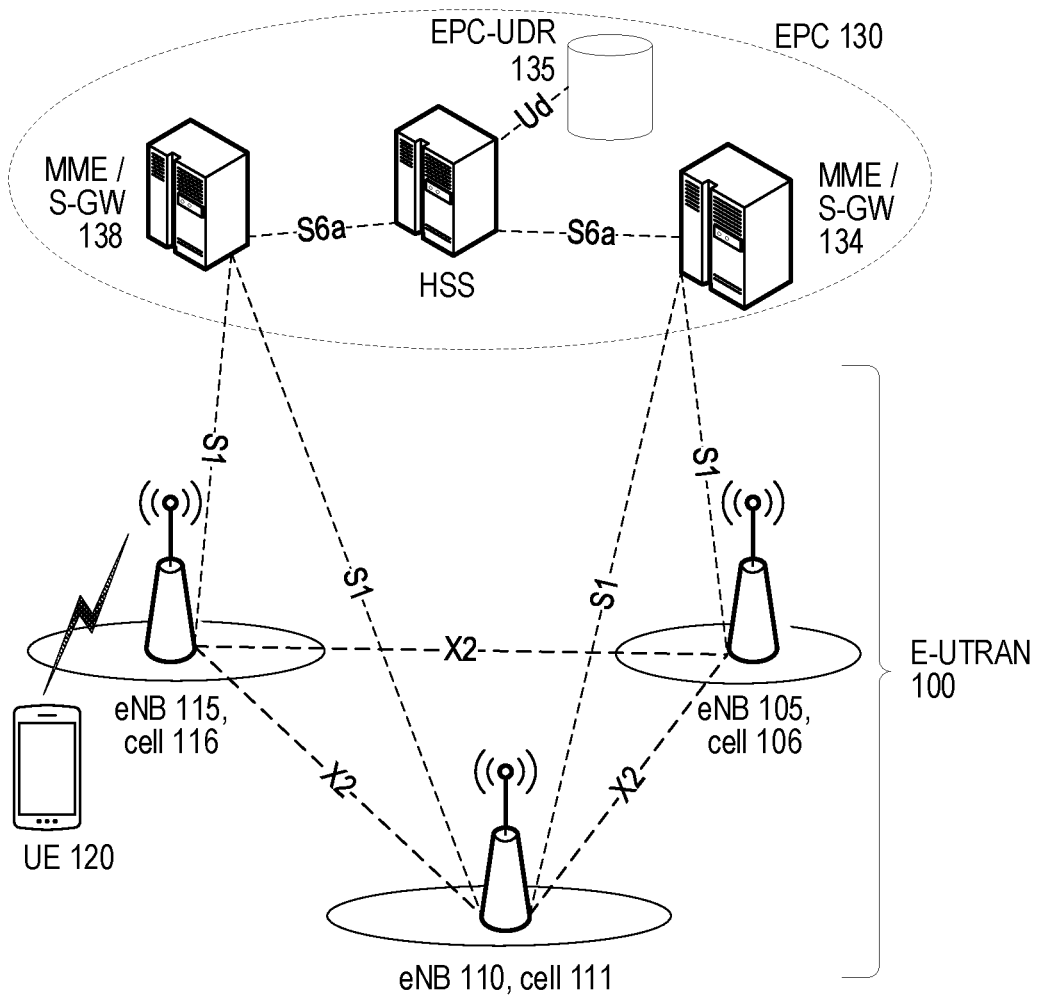
FIG. 1 is a high-level block diagram of an exemplary architecture of the Long-Term Evolution (LTE) Evolved UTRAN (E-UTRAN) and Evolved Packet Core (EPC) network.
Figure 2:
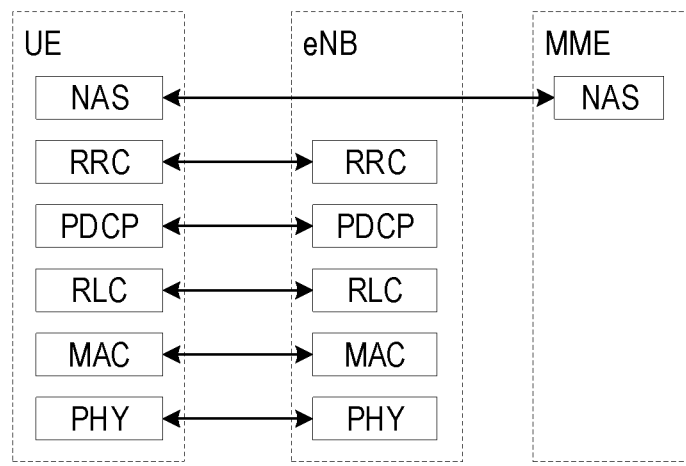
FIG. 2 shows exemplary control plane (CP) protocol layers of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the various embodiments will be apparent from the following description. Furthermore, various terms discussed below will be used throughout the application, which are summarized as follows.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The term "radio network node" can refer to any type of network node that can comprise any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH).

In some embodiments, a TRP may be associated with a network node or radio network node. In some embodiments, a multi-TRP scenario may include more than one TRPs associated with one or more network nodes.

Note that although terminology from one particular wireless system (e.g., LTE and/or NR) may be used herein, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IOT) device, aerial device (e.g., drone), ProSe UE, V2V UE, V2X UE, etc.

Unless otherwise noted, functions described herein as being performed by a WD, UE, network node, radio network node, etc. can be distributed over a plurality of devices and/or network nodes. In other words, it is contemplated that the functions of the network node and WD described herein are not limited to performance by a single physical device and, in fact, can be distributed among several physical devices.

Unless otherwise noted, the term "time resource" can correspond to any type of physical resource or radio resource expressed in terms of length of time or time interval or time duration. In some embodiments, the term "slot" is used to indicate a radio resource; however, it should be understood that the techniques described herein may advantageously be used with other types of radio resources, such as any type of physical resource or radio resource expressed in terms of length of time. Examples of time resources include symbol, time slot, minislot, subframe, radio frame, transmission time interval (TTI), interleaving time, a time resource number, etc.

Unless otherwise noted, the term "TTI" can correspond to any time period over which a physical channel can be encoded and interleaved for transmission (e.g., during the TTI). The physical channel can be decoded by the receiver over the same time period (T0) over which it was encoded. The TTI may also interchangeably called as short TTI (sTTI), transmission time, slot, sub-slot, mini-slot, short subframe (SSF), mini-subframe etc.

In some embodiments, a transmitter (e.g., network node) and a receiver (e.g., WD) can have a common, predetermined understanding about rule(s) for determining which resources to be arranged for transmission and/or reception of one or more physical channels. Such rules may, in some embodiments, be referred to as "mapping." In other embodiments, the term "mapping" may have other meanings.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, in particular if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G/NR) beams may be used instead of cells and, as such, concepts described herein apply equally to both cells and beams.

As briefly mentioned above, beam management is only supported on PCells and PSCells, with support for beam management in SCells under consideration for NR Rel-16. Some SCells may only support DL reception of channels/signals but other SCells may support both DL reception and UL transmission. This variation in SCell configuration and/or capabilities can create various problems, issues, and/or difficulties for beam management. This is discussed in more detail after the following description of NR network architectures and radio interface.

Figure 3:
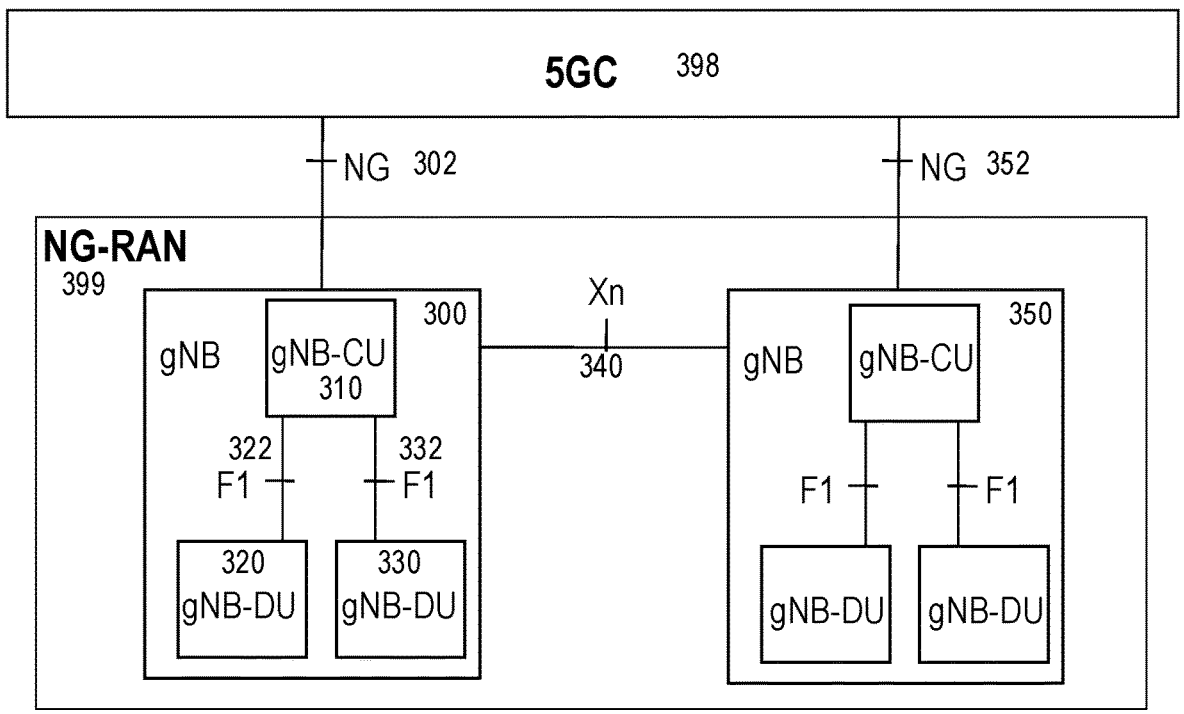
FIGS. 3-4 illustrate two high-level views of an exemplary 5G network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry.

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
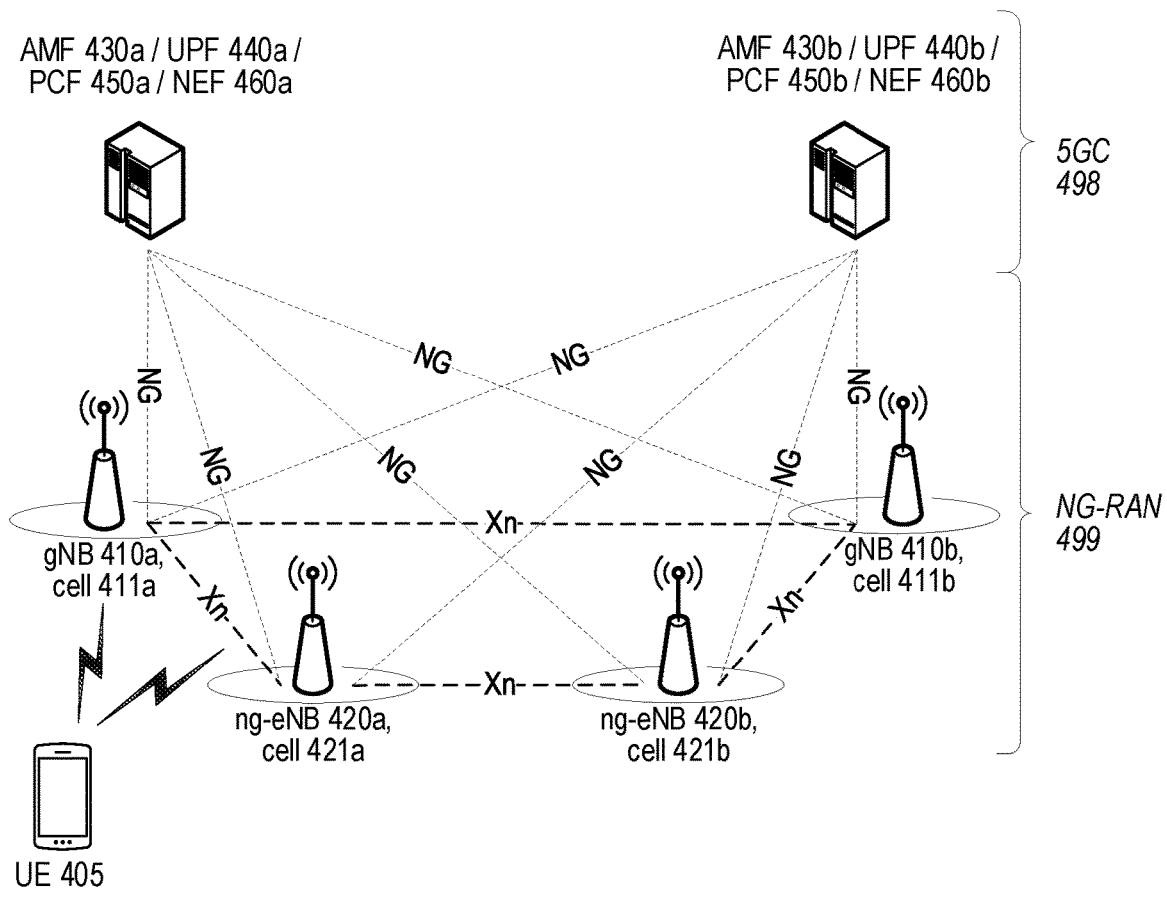

FIG. 4 shows another high-level view of an exemplary 5G network architecture, including an NG-RAN 499 and a 5GC 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to an Access and Mobility Management Function (AMF, e.g., AMFs 430a,b) via respective NG-C interfaces and to a User Plane Function (UPF, e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 405 can communicate with the gNB or ng-eNB serving that particular cell via the NR or LTE radio interface, respectively.

Figure 5:
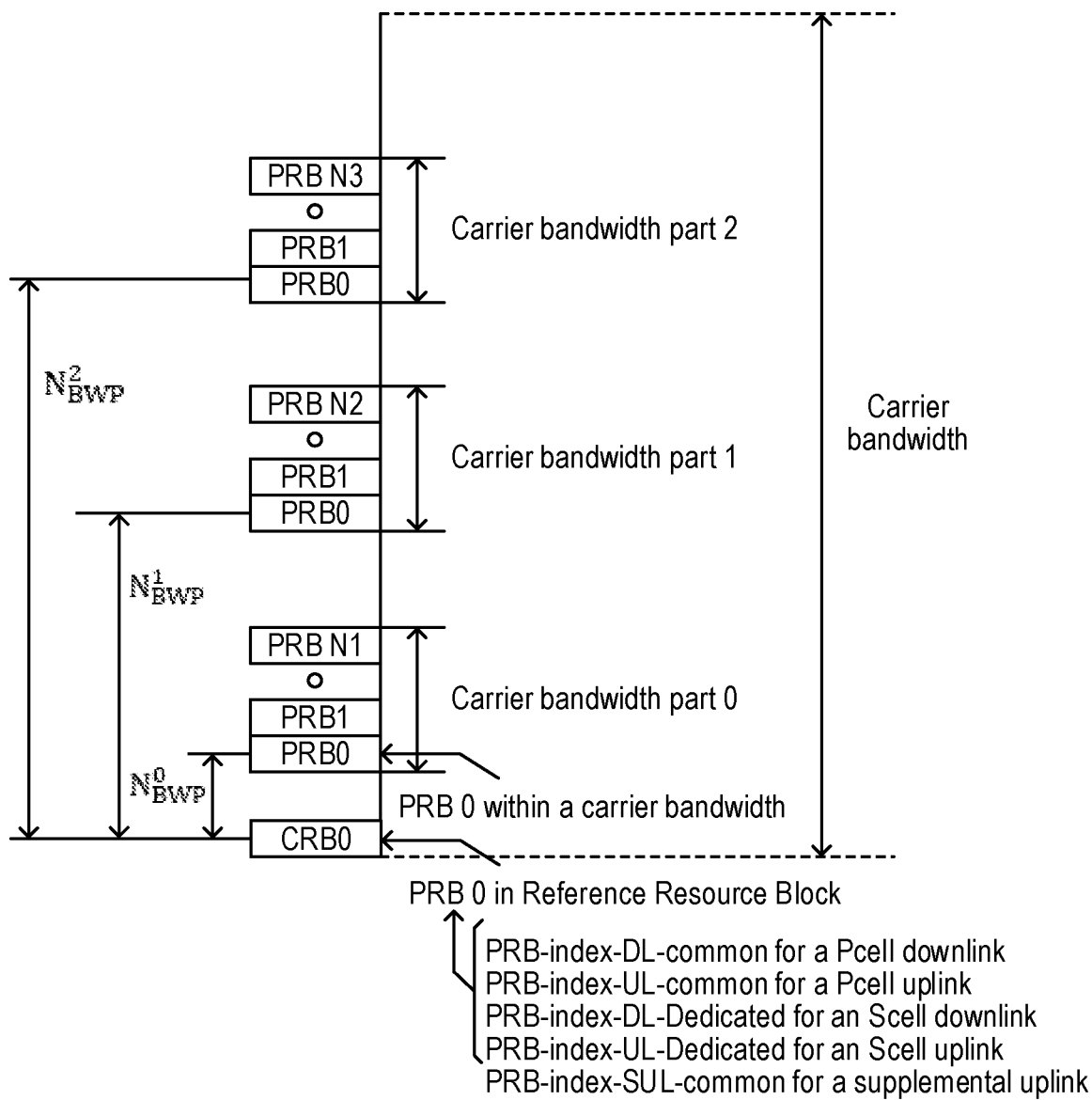
FIG. 5 shows an exemplary frequency-domain configuration for a 5G/NR UE.

FIG. 5 shows an exemplary frequency-domain configuration for an NR UE. In Rel-15 NR, a UE can be configured with up to four carrier bandwidth parts (BWPs) in a DL carrier bandwidth with a single DL BWP being active at a given time. A UE can be configured with up to four BWPs in an UL carrier bandwidth with a single UL BWP being active at a given time. If a UE is configured with a supplementary UL, the UE can be configured with up to four additional BWPs in the supplementary UL carrier bandwidth, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from 0 to $N_{BWP,i}^{size}-1$, where i is the index of the particular BWP for the carrier. For example, as shown in FIG. 3, BWP0 includes PRBs 0 to N1, BWP1 includes PRBs 0 to N2, and BWP2 includes PRBs 0 to N3.

NR supports various SCS values $\Delta f=(15\times 2^{\mu})$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu} \cdot 50$ MHz. Table 1 below summarizes currently-supported NR numerologies and associated parameters. Different DL and UL numerologies can be configured by the network.

TABLE 1

| μ | $\Delta f = 2^{\mu} \cdot$ 15 (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 6:
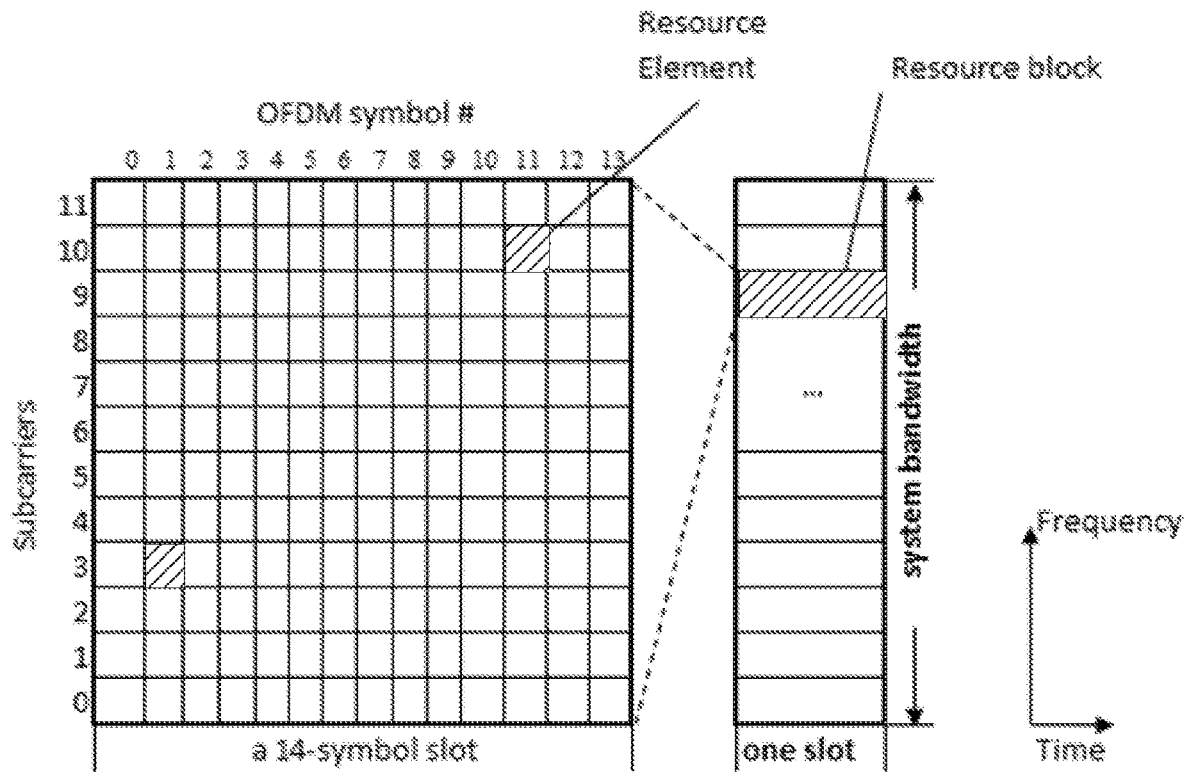
FIG. 6 shows an exemplary time-frequency resource grid for an NR (e.g., 5G) slot.

FIG. 6 shows an exemplary time-frequency resource grid for an NR slot within a carrier bandwidth. As illustrated in FIG. 6, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix (e.g., as shown in FIGS. 6) and 12 symbols for extended cyclic prefix.

Figure 7A:
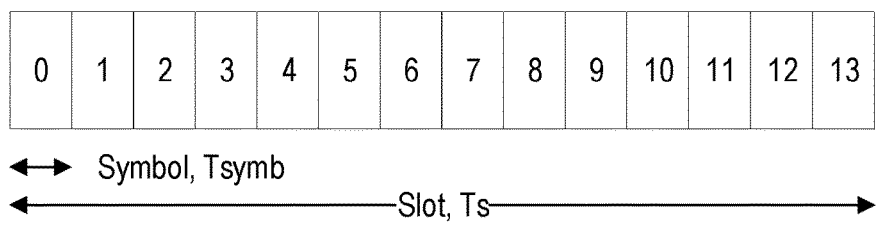
FIGS. 7A-7B, shows exemplary NR slot and mini-slot configurations.

FIG. 7A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 7B:
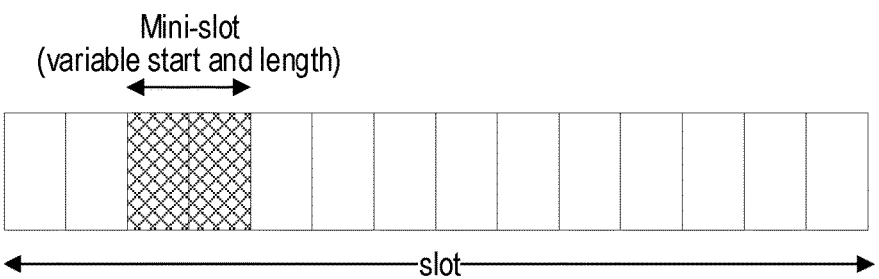

FIG. 7B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 7B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

Similar to LTE, NR data scheduling can be done dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In addition to dynamic scheduling, NR also supports semi-persistent scheduling (SPS) in the DL. In this approach, the network configures a periodicity of PDSCH transmission via RRC and then controls the start and stop of transmissions via DCI in PDCCH. One advantage of this technique is reduction of control signaling overhead on PDCCH. NR also supports a similar feature on the UL, referred to as configured grant (CG).

As briefly mentioned above, beam management is used to maintain beam connections between network and UE for transmission and reception. At a high level, beam management includes procedures for beam establishment, beam failure recovery, and beam indication.

In more detail, beam establishment involves the UE selecting the best (e.g., strongest) beam when it connects to the network. To facilitate identifying the beam, the gNB transmit different SSBs and/or CSI-RSs per beam. Beam establishment is usually performed at the same time UE performs initial cell search. At the initial cell search, the UE searches the strongest SSB block and identifies its location in time domain, which corresponds to the beam ID. This operation can also be referred to as a "beam search". The UE then attempts to connect to the network using this beam. While UE connects to the network, the UE measure the DL link quality of beam being used. If the link quality level is below a threshold, the UE detects beam failure and starts the beam recovery procedure.

In NR, beam failure recovery (BFR) is used to enable quick recovery from beam failure. Beam failure can happen for different reasons, such as sudden blocking of a DL beam or inefficient beam management procedures. The BFR procedure consists of several steps. In the first step, beam failure is detected in L1 (i.e., PHY) when the BLER of a (hypothetical) PDCCH is above a threshold for a certain time. This step is also called beam failure detection (BFD).In the second step, new candidate beams are identified by measuring beam identification RS, such as CSI-RS or SSB, that are above a threshold with respect to L1-RSRP on the measured RS. This step is also called candidate beam detection (CBD).

In NR, the MAC entity's BFR procedure may be configured by RRC. Beam failure is detected by counting beam failure instance indication from the lower layers to the MAC entity. In the third step, L2 (e.g., MAC) is given the set of candidate beams and a BFR is triggered, which will initiate a random access procedure. Typically, this will trigger a contention free random access (CFRA) where the UE transmits a dedicated preamble on PRACH resources that are dedicated to BFR, and indicates which beam is selected. These dedicated PRACH resources are not dedicated to a specific UE but are common to all UEs who do CFRA for BFR, similar to PRACH resources dedicated to different SSBs for initial access.

If UE cannot find the candidate beam within a particular time, the cell search procedure is triggered on the PCell/PScell. The particular time can be configured by the network via beamFailureRecoveryTimer, e.g., 100 ms. If not configured by the network, it is specified in 3GPP TS 38.133 (V16.2.0) according to the following tables, which depend on frequency range (FR1, FR2 and type of RS (SSB, CSI-RS) used. In these tables, P is a scaling factor according to scheduling restriction (P≥1.0), N is related to UE receiver beam switching factor (e.g., N=8), and $M_{CBD}$ is the number of CSI-RS samples in time domain (e.g., $M_{CBD}=3$).

TABLE 2

Evaluation period $T_{Evaluate\_CBD\_SSB}$ for FR1

| Configuration | $T_{Evaluate\_CBD\_SSB}$ (ms) |
|---|---|
| non-DRX, DRX cycle ≤ 320 ms | Ceil(3 × P) × $T_{SSB}$ |
| DRX cycle > 320 ms | Ceil(3 × P) × $T_{DRX}$ |

Note:

$T_{SSB}$ is the periodicity of SSB in the set $\bar{q}_1$. $T_{DRX}$ is the DRX cycle length.

TABLE 3

Evaluation period $T_{Evaluate\_CBD\_SSB}$ for FR2

| Configuration | $T_{Evaluate\_CBD\_SSB}$ (ms) |
|---|---|
| non-DRX, DRX cycle ≤ 320 ms | Ceil(3 × P × N) × $T_{SSB}$ |
| DRX cycle > 320 ms | Ceil(3 × P × N) × $T_{DRX}$ |

Note:

$T_{SSB}$ is the periodicity of SSB in the set $\bar{q}_1$.
$T_{DRX}$ is the DRX cycle length.

TABLE 4

Evaluation period $T_{Evaluate\_CBD\_CSI\text{-}RS}$ for FR1

| Configuration | $T_{EvaluateC\_CBD\_CSI\text{-}RS}$ (ms) |
|---|---|
| non-DRX, DRX cycle ≤ 320 ms | Max(25, Ceil($M_{CBD}$ × P) × $T_{CSI\text{-}RS}$) |
| DRX cycle > 320 ms | Ceil($M_{CBD}$ × P) × $T_{DRX}$ |

Note:

$T_{CSI\text{-}RS}$ is the periodicity of CSI-RS resource in the set $\bar{q}_1$.
$T_{DRX}$ is the DRX cycle length.

TABLE 5

Evaluation period $T_{Evaluate\_CBD\_CSI-RS}$ for FR2

| Configuration | $T_{Evaluate\_CBD\_CSI-RS}$ (ms) |
|---|---|
| non-DRX, DRX cycle ≤ 320 ms | Max(25, Ceil($M_{CBD}$ × P × N) × $T_{CSI-RS}$) |
| DRX cycle > 320 ms | Ceil($M_{CBD}$ × P × N) × $T_{DRX}$ |

Note:
$T_{CSI-RS}$ is the periodicity of CSI-RS resource in the set $\bar{q}_1$.
$T_{DRX}$ is the DRX cycle length.

After UE has detects a new beam in an SCell, the UE first sends a scheduling request (SR) for SCell BFR on PUCCH in PCell, as configured by the network. After the network receives the SR for SCell BFR, the network sends UL grant to UE. After UE receives the UL grant, UE sends an SCell BFR MAC CE inform the network of the determined beam (i.e., SSB or CSI-RS). If UE cannot find a candidate beam within the configured time limit (i.e., beamFailureRecoveryTimer, e.g., 100 ms), UE also sends a SR on PUCCH in PCell, and then sends 'no beam found' in SCell BFR MAC CE.

In some configurations, SCell may only support DL reception of channels/signals by the UE, but in other configurations SCell may support both DL reception and UL transmission by the UE. However, the UE may be required to transmit in UL on SCell after completion of candidate beam detection procedure, depending on where the CBD procedure is performed. The UE behavior for transmitting in UL for the first type of configuration, where the UE has no UL support in the SCell, is unspecified and ambiguous. Depending on how various implementations address this ambiguity, there can be various undesirable effects for the UE and network, such as very long procedure delay, unnecessary power consumption, unwanted interference in the network, and lack of coordination.

Embodiments of the present disclosure can address these and other issues, problems, and/or difficulties with beam failure recovery in SCells by ensuring a maximum duration between when the UE detects beam failure and when the UE finds new beam(s), as well as a maximum duration between when the UE detects beam failure and when the UE determines that it cannot find new beams. Accordingly, ambiguity in UE behavior for the BFD procedure on the SCell is reduced, mitigated, and/or eliminated. Moreover, such embodiments reduce UE energy consumption by stopping UE reception of DL signals from the SCell after reporting "no new beam found." In addition, such embodiments reduce interference to other nodes by the UE refraining from transmitting any UL signals in the SCell after it is unable to detect any suitable beam.

At a high level, in some embodiments, a UE transmits random access (RA) preambles within a time period, T, where T=f(T1, T2, D), f is a function of parameters, T1 is the periodicity of PRACH corresponding to a reported new beam, T2 is a time between beam failure detection and the determination of a new beam, and D is additional processing time required by UE. In some cases, T1 can be configured by the network.

At a high level, in other embodiments, a UE transmits a scheduling request (SR) on an UL channel (e.g., PUCCH, PUSCH) in an SpCell (e.g., PCell or PSCell) within time period, T, where T=f(T3, T2, D), T3 is the periodicity of PUCCH SR for SCell beam failure recovery in PCell, and f, T2, and D are defined above. In some cases, T3 can be configured by the network.

In variants of these other embodiments, upon determining 'no new beam found in SCell', the UE performs one or more tasks such as stopping monitoring DL signals in the SCell, stopping transmitting UL signals in the SCell, stopping monitoring and/or transmitting in SCell when UE uses independent beams on SpCell and SCell, using a PCell beam for operation on the SCell when a common beam is supported on PCell and SCell, etc.

Embodiments of the present disclosure are applicable to standalone (SA), carrier aggregation (CA), and/or multi-connectivity (MuC) scenarios, etc. An example of MuC is dual connectivity (DC) comprising MCG and SCG served/managed/controlled via PCell and PSCell, respectively. Specific examples of DC are NR-DC, EN-DC, NE-DC etc. For example, the UE can be configured with a PCell in SA, NR-DC, or NE-DC, and with a PSCell in NR-DC and EN-DC. In these scenarios, the network node configures the UE's candidate beam reference signal list (e.g., via RRC signaling), which includes SSB ID(s) and/or CSI-RS resource ID(s). The network node also configures a threshold for determining candidate beam(s). Example of thresholds include rsrp-ThresholdSSB or rsrp-ThresholdSSBBFR. The network may also configure a timer (e.g., beamFailureRecoveryTimer) with a particular value (e.g., 100 ms), which is used by the UE to start the timer upon initiation of a beam failure recovery procedure.

In this scenario, the network also allocates PRACH resources for each candidate beam RS (e.g., SSB, CSI-RS) and they are scheduled periodically, e.g., every radio frame (10 ms). Each candidate beam RS may be configured with the dedicated PRACH resources, or some candidate beam reference signals may share PRACH resource. Once the UE starts to communicate with its SpCell (e.g., PCell or PSCell), the UE monitors DL link quality of the monitoring beam reference resource. If the measured DL link quality is below a threshold, the UE PHY indicates beam failure to a higher layer (e.g., MAC). If the number of PHY indication exceeds the threshold configured by the network, then UE declares "beam failure detection" and starts the candidate beam detection procedure for beam failure recovery in the SpCell.

Figure 9:
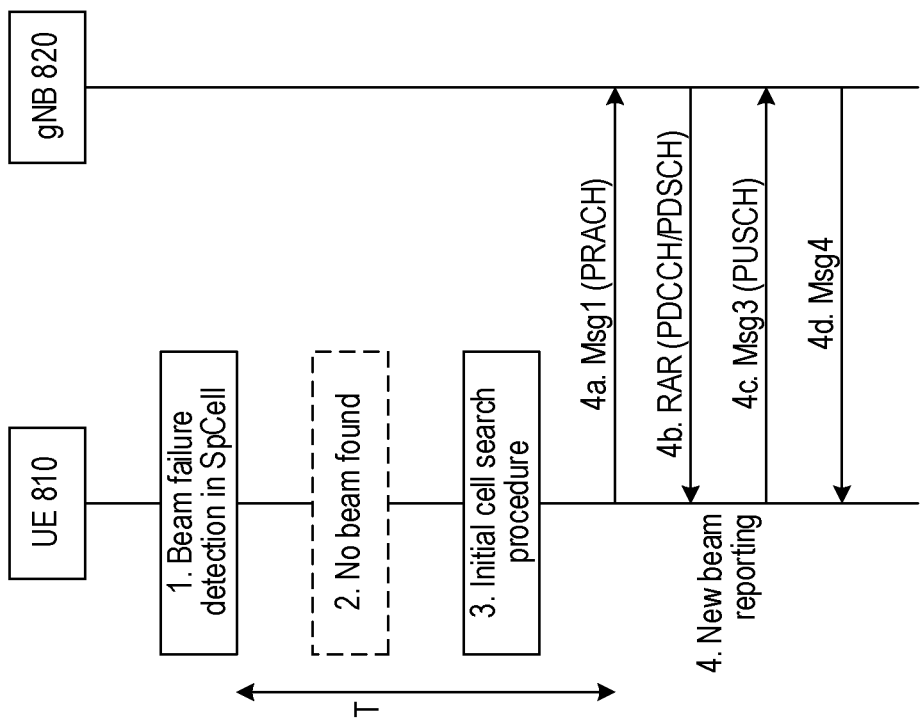
FIGS. 8-9 are signal flow diagrams of exemplary procedures for UE beam failure recovery in an SpCell (e.g., PCell or PSCell), according to various exemplary embodiments of the present disclosure.
Figure 8:
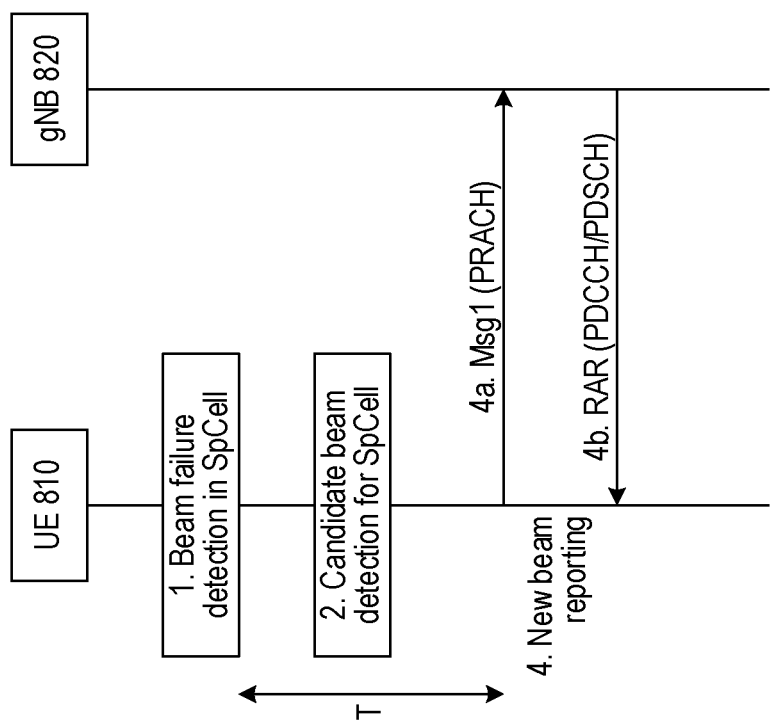

Embodiments of a UE procedure for beam failure recovery in SpCell (e.g., PCell or PSCell) are described in more detail below. These embodiments are also illustrated by FIGS. 8-9, which are signal flow diagrams corresponding to when the UE (810) finds a candidate beam after beam failure detection in an SpCell (e.g., provided by gNB 820) and when the UE does not find a candidate beam, respectively.

After UE detects the beam failure in an SpCell (e.g., PCell or PSCell) in operation 1, UE starts the candidate beam detection procedure in operation 2. In this procedure, the UE calculates L1-RSRP of for each candidate beam resources (e.g., SSB and/or CSI-RS) configured by the network node. If the calculated L1-RSRP value exceeds the threshold configured by the network node, the UE adds the corresponding beam resource to the candidate beam list.

After completing operation 2, if there are one or more candidate beams in the candidate beam list, the UE first determines which of the candidate beams to be reported to the network node. For example, UE can select the beam that has the highest signal strength (e.g., maximum L1-RSRP) of the measured values of all candidate beams. After determining the beam, the UE proceeds to new beam reporting in operation 4. In operation 4a, the UE transmits a RA preamble to the SpCell on PRACH corresponding to the beam being reported, using RA random access resources. In operation 4b, the network responds on PDCCH or PDSCH with a random access response (RAR).

If within the maximum allowed time period for detecting a candidate beam, the UE cannot find any candidate beam with a measured SSB L1-RSRP that exceeds the threshold, UE moves to operation 3. The maximum allowed time can be based on the beamFailureRecoveryTimer timer if configured by the network. In another example, the maximum allowed time may correspond to a fixed value e.g., $T_{Evaluate\_CBD\_SSB}$ for SS/PBCH or $T_{Evaluate\_CBD\_CSI-RS}$ for CSI-RS, as specified in the tables listed above.

In operation 3, the UE performs an initial cell search on the SpCell, in which the UE searches for the strongest SSB (or equivalently, the strongest beam) and identifies location in time domain, which corresponds to the beam ID. In operation 4, the UE reports this new beam to the network. More specifically, in operation 4a, the UE transmits random access preambles to the SpCell (i.e., PCell or PSCell) on PRACH corresponding to the selected beam contention-based RA resources. The remainder of the contention-based RA procedure is carried out in operations 4b-4d.

In some embodiments, UE transmits RA preambles (operation 4a) within a time period T after beam failure detection (operation 1), where T=f(T1, T2, D) and T1 is the periodicity of PRACH corresponding to the new beam being reported, which can be configured by the network. In addition, T2 is the time between beam failure detection (operation 1) to the determination of a new beam.

In the case UE find new beams, T2=T3, where T3 corresponds to the period for the candidate beam detection and the new beam determination. Example of T2 is the timer value beamFailureRecoveryTimer when configured. Since the timer may not expire, this in practice means T3≤T2. Another example of T2 is the $T_{Evaluate\_CBD\_SSB}$ for SS/PBCH or $T_{Evaluate\_CBD\_CSI-RS}$ for CSI-RS, as specified in 3GPP TS 38.133 (V16.3.0) and shown in the tables listed above.

In the case UE cannot find new beams within T3, T2=T3+T4, where T3 corresponds to the period for the candidate beam detection and the new beam determination (discussed above), and T4 is the period to determine SSB for contention-based RA procedure.

In either case, D is additional processing time required by UE (e.g., in ms, slots, etc.). D can be zero or a positive value. For example, D can depend on the UE's capability to operate using independent beams, or common beams for SpCells and cells where beam management is performed. In another example, D may depend on the frequencies of the SpCell and the cell where beam management is performed. If the separation of the two frequencies is larger than a threshold, then D can be larger than 0. Otherwise, if the separation is less than the threshold, then D can be 0.

Some examples of f(T1, T2, D) include f(T1, T2, D)=T1×Ceil [(T2+D)/T1], or f(T1, T2, D)=T1×{Ceil (T2/T1)+Ceil (D/T1)}, which Ceil( ) gives the next largest integer of the operand.

In another scenario, the network configures at least one SCell together with PCell/PSCell. In this scenario, the network also configures the candidate beam reference signal list, the threshold to determine the candidate beam(s), and optionally the timer (e.g., beamFailureRecoveryTimer) for the SCell as well as for the PCell/PSCell. In this scenario, the network allocates PUCCH resources for transmitting Scheduling Request (SR) for beam failure recovery (BFR) on the SCell. The PUCCH resources for SCell BFR SR are scheduled periodically (e.g., every 10 slots) in the PCell, SpCell, and SCell. Similar to beam measurement in PCell/PSCell, once UE starts to communicate with the SCell, the UE monitors the DL link quality of the monitoring beam reference resource in the SCell. If the measured DL link quality is below a threshold, the UE PHY indicates beam failure to a higher layer (e.g., MAC). If the number of PHY indications exceeds the threshold configured by the network, then UE declares "beam failure detection" and starts the candidate beam detection procedure for beam failure recovery in the SCell.

Figure 11:
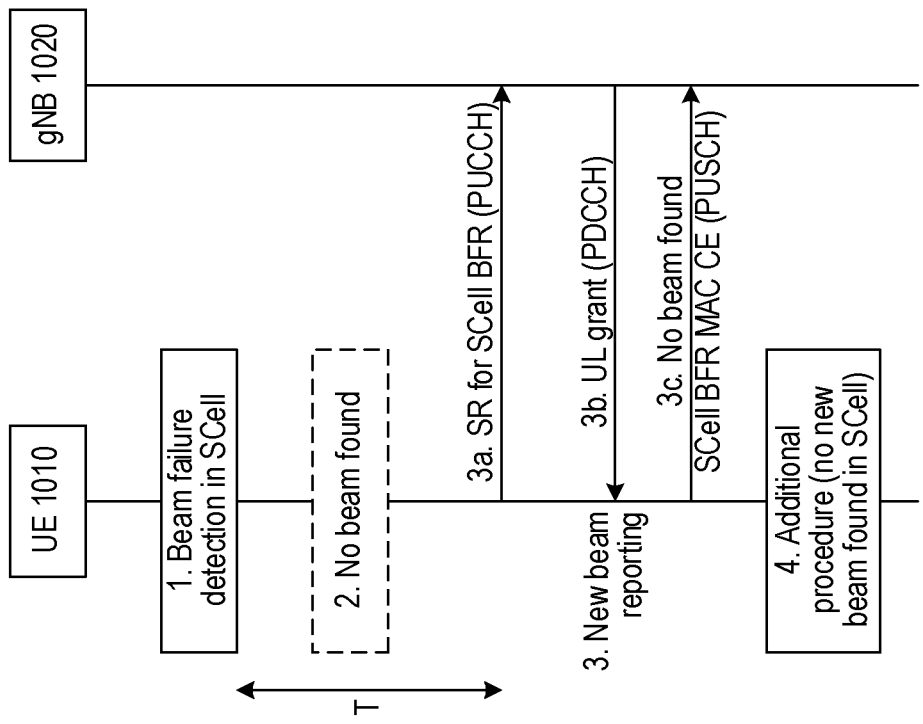
FIGS. 10-11 are signal flow diagrams of exemplary procedures for UE beam failure recovery in an SCell, according to various exemplary embodiments of the present disclosure.
Figure 10:
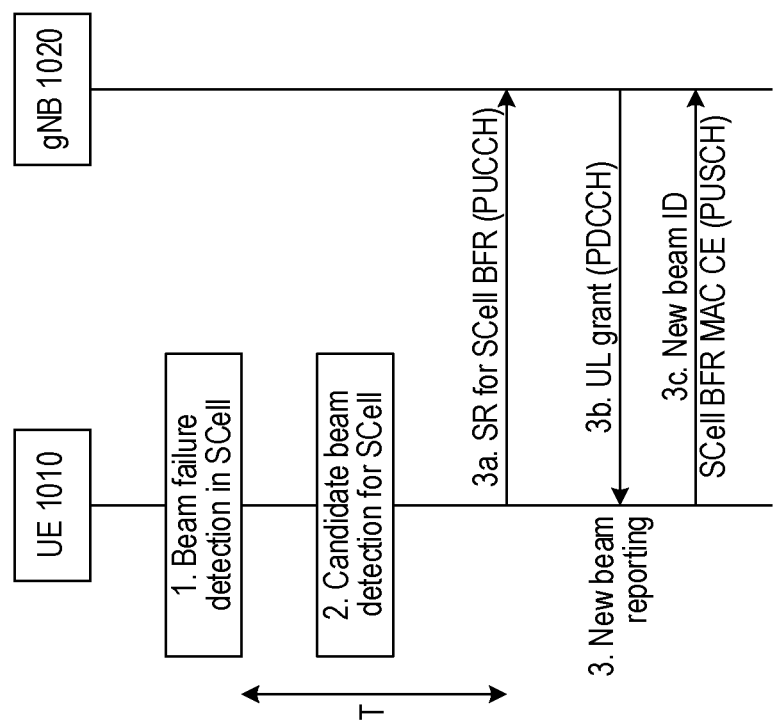

Embodiments of a UE procedure for beam failure recovery in an SCell are described in more detail below. These embodiments are also illustrated by FIGS. 10-11, which are signal flow diagrams corresponding to when the UE (1010) finds a candidate beam after beam failure detection in an SCell and when the UE does not find a candidate beam, respectively.

After UE detects the beam failure in an SCell) in operation 1, UE starts the candidate beam detection procedure in operation 2. In this procedure, the UE calculates L1-RSRP of for each candidate beam resources (e.g., SSB and/or CSI-RS) configured by the network node. If the calculated L1-RSRP value exceeds the threshold configured by the network node, the UE adds the corresponding beam resource to the candidate beam list.

After completing operation 2, if there are one or more candidate beams in the candidate beam list, the UE first determines which of the candidate beams to be reported to the network node. For example, UE can select the beam that has the highest signal strength (e.g., maximum L1-RSRP) of the measured values of all candidate beams. After determining the beam, the UE proceeds to new beam reporting in operation 3.

If within the maximum allowed time period for detecting a candidate beam, the UE cannot find any candidate beam with a measured SSB L1-RSRP that exceeds the threshold, UE also moves to operation 3. The maximum allowed time can be based on the beamFailureRecoveryTimer timer if configured by the network. In another example, the maximum allowed time may correspond to a fixed value e.g., $T_{Evaluate\_CBD\_SSB}$ for SS/PBCH or $T_{Evaluate\_CBD\_CSI-RS}$ for CSI-RS, as specified in the tables listed above. In this scenario, the UE notes "no new beam found" when moving to operation 3.

Operation 3 involves new beam reporting for the UE. Regardless of whether the UE found a new beam in operation 2, UE transmits a SR on PUCCH in operation 3a. The PUCCH can be configured by the network in UE's PCell, PSCell, or SCell. After UE transmits SR on PUCCH in the particular cell, the UE waits for an UL grant from the network node. After the UE receives the UL grant (operation 3b), in operation 3c the UE transmits new beam information with SCell BFR MAC CE if UE has found a new beam from the candidate beam list. New beam information can include index of SCell where new beam was found, as well as SSB index or CSI-RS index associated with the new beam. On the other hand, if the UE found no new beam in operation 2, the UE transmits a 'no new beam found' message to the PCell with SCell BFR MAC CE.

In some embodiments, UE transmits SR (operation 4a) on an UL channel (e.g., PUCCH or PUSCH) in the configured cell within a period T after beam failure detection (operation 1), where T=f(T1, T2, D). Also, T1 is the periodicity of PUCCH for SR transmission for SCell beam failure recovery, which can be configured by the network. In addition, T2 is the time between beam failure detection (operation 1) to the determination of a new beam or that no new beam can be found.

In embodiments where the timer value beamFailureRecoveryTimer is configured, T2 can be the value configured for the timer. Another example of T2 is the $T_{Evaluate\_CBD\_SSB}$ for SS/PBCH or $T_{Evaluate\_CBD\_CSI-RS}$ for CSI-RS, as specified in 3GPP TS 38.133 (V16.3.0) and shown in the tables listed above.

In addition, D is additional processing time required by UE (e.g., in ms, slots, etc.). D can be zero or a positive value. For example, D can depend on the UE's capability to operate using independent beams, or common beams for SpCells and cells where beam management is performed. In another example, D may depend on the frequencies of the SpCell and the cell where beam management is performed. If the separation of the two frequencies is larger than a threshold, then D can be larger than 0. Otherwise, if the separation is less than the threshold, then D can be 0.

Some examples of the function f(T1, T2, D) include:
f(T1, T2, D)=T1×Ceil[(T2+D)/T1], and
f(T1, T2, D)=T1×{Ceil (T2/T1)+Ceil(D/T1)},
where Ceil( ) gives the next largest integer of the operand.

If the UE reports "no new beam found" in the SCell BFR MAC CE (or other similar information) sent in operation 3c, the UE proceeds to operation 4, in which the UE performs one or more operations that are conditional upon determining and reporting "no new beam found." When performed, such operations are performed for a duration (T0) that can be pre-defined (e.g., in a 3GPP specification) or configured by the network (e.g., via RRC signaling). Exemplary conditional operations include:

Refraining from monitoring certain DL signals or channels on the SCell for which the UE reported "no new beam found" to the network via SpCell (e.g., PCell, PSCell), thereby reducing UE energy consumption. For example, the UE can stop monitoring PDCCH and/or PDSCH on the SCell.

Refraining from monitoring all DL signals or channels on the SCell for which the UE reported "no new beam found" to the network (e.g., turn off receiver in relation to SCell). This can further reduce UE energy consumption.

Refrain from transmitting certain UL signals or channels on the SCell for which the UE reported "no new beam found" to the network, thereby reducing UL interference and UE energy consumption.

Refrain from transmitting all UL signals or channels on the SCell for which the UE reported "no new beam found" to the network (e.g., turn off transmitter in relation to SCell), which further reduces UL interference and UE energy consumption.

The UE can perform any of these conditional operations also based on a relation between the beams of SpCell and the SCell for which the UE reported "no new beam found". For example, the UE perform any of these operations if the UE is capable of operating independent beams on SpCell and SCell. "Independent beams" may be necessary when two beams are required to operate on frequencies that are separated by more than a threshold. A more specific example is when an SpCell and an SCell operate relatively distant frequency bands such as 28 GHz and 39 GHz (or vice versa).

As another example, the UE may refrain from performing any of these conditional operations if the UE is not capable of operating independent beams on SpCell and SCell, such as when the UE uses a common beam for SpCell and SCell operations. For example, a common beam may be used when SpCell and SCell operate on frequencies that are separated by less than a threshold. One specific example is when SpCell and SCell operate in relatively proximate frequency bands such as 24 GHz and 28 GHz (or vice versa).

Figure 12:
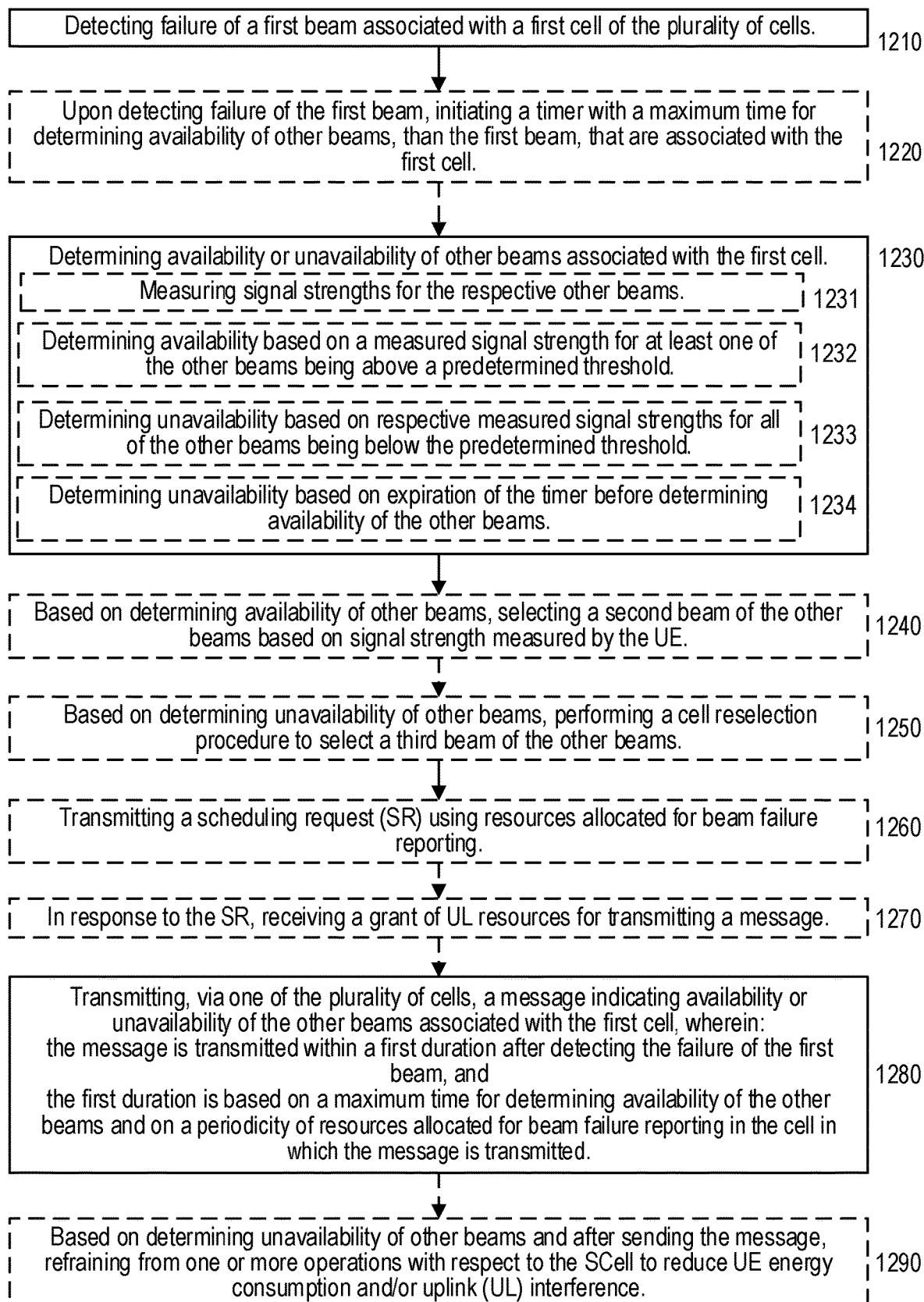
FIG. 12 shows a flow diagram of an exemplary method (e.g., procedure) for a user equipment (UE, e.g., wireless device, IoT device, etc.), according to various exemplary embodiments of the present disclosure.
Figure 13:
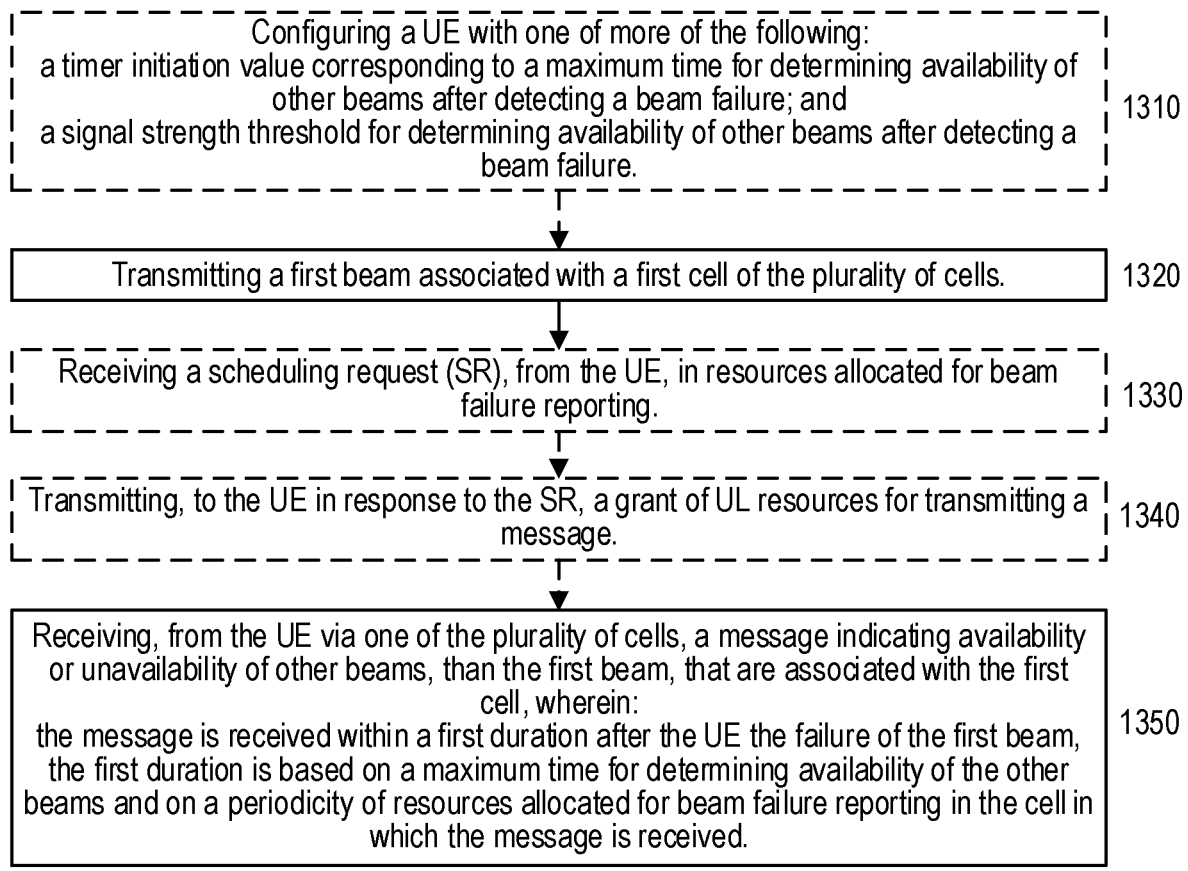
FIG. 13 shows a flow diagram of an exemplary method (e.g., procedure) for a network node (e.g., base station, eNB, gNB, en-gNB, etc., or component thereof), according to various exemplary embodiments of the present disclosure.

These embodiments described above can be further illustrated with reference to FIGS. 12-13, which depicts exemplary methods performed by a UE and a network node, respectively. In other words, various features of the operations described below, with reference to FIGS. 12-13, correspond to various embodiments described above. The exemplary methods shown in FIGS. 12-13 can be used cooperatively to provide various exemplary benefits and/or advantages described herein. Although FIGS. 12-13 shows specific blocks in particular orders, the operations of the exemplary methods can be performed in different orders than shown and can be combined and/or divided into blocks having different functionality than shown. Optional blocks or operations are indicated by dashed lines.

In particular, FIG. 12 shows a flow diagram of an exemplary method (e.g., procedure) for a UE configured for communication via a plurality of cells in a wireless network, according to various exemplary embodiments of the present disclosure. The exemplary method can be performed by a UE (e.g., wireless device, IoT device, modem, etc. or component thereof) such as described herein with reference to other figures.

The exemplary method can include the operations of blocks 1210, where the UE can detect failure of a first beam associated with a first cell of the plurality of cells. The exemplary method can also include the operations of blocks 1230, where the UE can determine availability of other beams, than the first beam, that are associated with the first cell. The exemplary method can also include the operations of blocks 1280, where the UE can transmit, to one of the plurality of cells, a message indicating availability or non-availability of the other beams associated with the first cell. The message is transmitted within a first duration after detecting the failure of the first beam. The first duration can be based on a maximum time for determining availability of the other beams and on a periodicity of resources allocated for beam failure reporting in the cell in which the message is transmitted.

In some embodiments, the first duration can be further based on:
UE capabilities to operate using independent or common beams for the first cell and other cells of the plurality of cells; and
differences in carrier frequencies between the first cell and other cells of the plurality of cells.

In some embodiments, determining availability or unavailability in block 1230 can include the operations of sub-blocks 1231-1233. In sub-block 1231, the UE can measure signal strengths for the respective other beams. In sub-block 1232, the UE can determine availability based on a measured signal strength for at least one of the other beams being above a predetermined threshold (e.g., that can be configured by the wireless network). Alternately, in sub-block 1233, the UE can determine unavailability based on respective measured signal strengths for all other beams being below the predetermined threshold.

In some embodiments, the exemplary method can also include the operations of block 1220, where the UE can, upon detecting failure of the first beam, initiate a timer with a maximum time for determining availability of the other beams. In such embodiments, determining availability or unavailability in block 1230 can include the operations of block 1234, where the UE can determine unavailability based on expiration of the timer before determining availability of the other beams.

In some embodiments, the exemplary method can also include the operations of blocks 1240, where the UE can, based on determining availability of other beams, select a second beam of the other beams based on signal strength measured by the UE. In such embodiments, the message transmitted in block 1280 can indicate the second beam.

In some of these embodiments, the first cell is a PCell or a PSCell and the message is transmitted, in the first cell, as a random-access (RA) preamble using RA resources that correspond to the selected second beam. An example of such embodiments is shown in FIG. 8.

In some of these embodiments, the exemplary method can also include the operations of block 1250, where the UE can, based on determining unavailability of other beams (e.g., in block 1230), perform a cell reselection procedure to select a third beam of the other beams. In such embodiments, the message can be transmitted, in the first cell, as a RA preamble using RA resources that correspond to the third beam.

In some of these embodiments, the first duration is based on periodicity of the RA resources corresponding to the second beam or to the third beam, i.e., depending on whether availability or unavailability was determined (e.g., in block 1230).

In other embodiments, the first cell is an SCell and the message is transmitted as a MAC message via a cell other than the first cell. In particular, the other cell is a PCell or a PSCell. Examples of such embodiments are shown in FIGS. 10-11.

In some of these embodiments, the exemplary method can also include the operations of blocks 1260-1270. In block 1260, the UE can transmit a scheduling request (SR) using resources allocated for beam failure reporting. In block 1270, the UE can, in response to the SR, receive a grant of UL resources for transmitting the message (e.g., in block 1280). In such embodiments, the first duration is based on periodicity of the resources allocated for SR associated with beam failure recovery.

In some of these embodiments, the exemplary method can also include the operations of block 1290, where the UE can, based on determining unavailability of other beams (e.g., in block 1230) and after sending the message (e.g., in block 1280), refrain from one or more operations with respect to the SCell to reduce UE energy consumption and/or UL interference. In some embodiments, the UE can refrain from (i.e., not perform) the one or more operations for a second duration that is configured by the wireless network. In various embodiments, the one or more operations can include any of the following:
- monitoring at least one DL signal or channel associated with the first cell;
- monitoring all DL signals or channels associated with the first cell;
- transmitting at least one UL signal or channel associated with the first cell; and
- transmitting all UL signals or channels associated with the first cell.

In addition, FIG. 13 shows a flow diagram of an exemplary method (e.g., procedure) for communicating with a UE via beams associated with a plurality of cells, according to various exemplary embodiments of the present disclosure. The exemplary method can be performed by one or more network nodes (e.g., base stations, eNBs, gNBs, en-gNBs, etc., or components thereof) such as described elsewhere herein with reference to other figures. In the following, "the network node" refers to any one of the network nodes.

The exemplary method can include the operations of blocks 1330, where the network node can transmit a first beam associated with a first cell of the plurality of cells. The exemplary method can also include the operations of blocks 1360, where the network node can receive, from the UE in one of the plurality of cells, a message indicating availability or unavailability of the other beams, than the first beam, that are associated with the first cell. The message can be received within a first duration after the UE detects failure of the first beam. The first duration can be based on a maximum time for determining availability of the other beams and on a periodicity of resources allocated for beam failure reporting in the cell in which the message is received.

In some embodiments, the first duration can be further based on:
- UE capabilities to operate using independent or common beams for the first cell and other cells of the plurality of cells; and
- differences in carrier frequencies between the first cell and other cells of the plurality of cells.

In some embodiments, the exemplary method can also include the operations of blocks 1310, where the network node can configure the UE with one or more of the following:
- a timer initiation value corresponding to a maximum time for determining availability of other beams after detecting a beam failure; and
- a signal strength threshold for determining availability of other beams after detecting a beam failure.

The timer initiation value and/or the signal strength threshold can be used by the UE in the manner described above with respect to FIG. 12.

In some embodiments, the first cell is a PCell or a PSCell. When the message indicates availability, the message indicates a second beam, of the plurality of beams, that was selected by the UE, and the message is received, in the first cell, as a RA preamble using RA resources corresponding to the second beam. An example of such embodiments is shown in FIG. 8.

In some of these embodiments, when the message indicates unavailability, the message indicates a third beam, of the plurality of beams, that was selected by the UE and the message is received, in the first cell, as a RA preamble using RA resources that correspond to the third beam.

In some of these embodiments, the first duration is based on periodicity of the RA resources corresponding to the second beam or to the third beam, i.e., depending on whether availability or unavailability was indicated by the message (e.g., in block 1350).

In other embodiments, the first cell is an SCell and the message is received as a MAC message via a cell other than the first cell. In particular, the other cell is a PCell or a PSCell. Examples of such embodiments are shown in FIGS. 10-11.

In some of these embodiments, the exemplary method can also include the operations of blocks 1340-1350. In block 1340, the network node can receive a scheduling request (SR), from the UE, in resources allocated for beam failure reporting. In block 1350, the network node can transmit, to the UE in response to the SR, a grant of UL resources for transmitting the message (e.g., in block 1360). In some of these embodiments, the first duration is based on periodicity of the resources allocated for SR associated with beam failure recovery.

In some of these embodiments, when the message (e.g., in block 1360) indicates availability of other beams, the message also indicates a second beam, of the plurality of beams, that was selected by the UE. An example is shown in FIG. 10. In other embodiments, the message indicates that no other beam is available. An example is shown in FIG. 11.

In some embodiments, a single network node transmits the first beam (e.g., in block 1320) and receives the message (e.g., in block 1350). In other embodiments, a first network node transmits the first beam and a second network node receives the message. For example, an SpCell and an SCell can be in different network nodes, such as in different frequency bands.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 14:
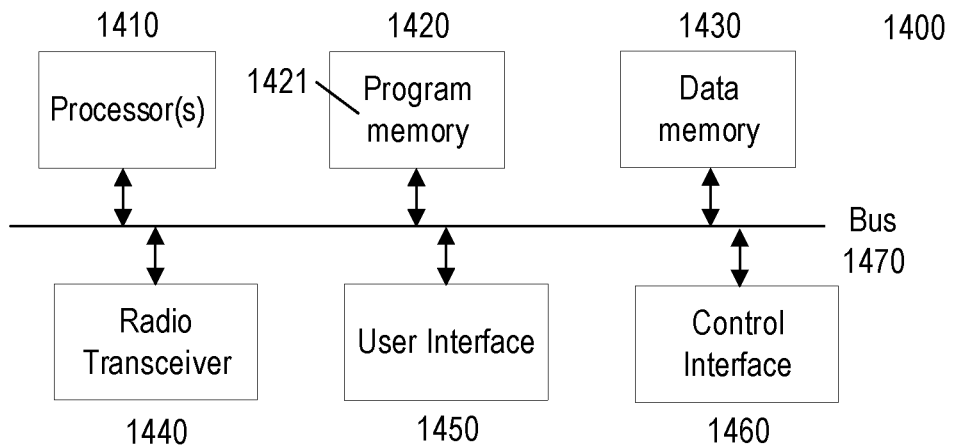
FIG. 14 is a block diagram of an exemplary wireless device or UE according to various exemplary embodiments of the present disclosure.

FIG. 14 shows a block diagram of an exemplary wireless device or user equipment (UE) 1400 (hereinafter referred to as "UE 1400") according to various embodiments of the present disclosure, including those described above with reference to other figures. For example, UE 1400 can be configured by execution of instructions, stored on a computer-readable medium, to perform operations corresponding to one or more of the exemplary methods described herein.

UE 1400 can include a processor 1410 (also referred to as "processing circuitry") that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product 1421 in FIG. 14) that, when executed by processor 1410, can configure and/or facilitate UE 1400 to perform various operations, including operations corresponding to various exemplary methods described herein. As part of or in addition to such operations, execution of such instructions can configure and/or facilitate UE 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1440, user interface 1450, and/or control interface 1460.

As another example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1410 can execute program code stored in program memory 1420 that, together with radio transceiver 1440, implements device-to-device (D2D) communications with other compatible devices and/or UEs.

Program memory 1420 can also include software code executed by processor 1410 to control the functions of UE 1400, including configuring and controlling various components such as radio transceiver 1440, user interface 1450, and/or control interface 1460. Program memory 1420 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from UE 1400, from which the instructions can be downloaded into program memory 1420 located within or removably coupled to UE 1400, so as to enable execution of such instructions.

Data memory 1430 can include memory area for processor 1410 to store variables used in protocols, configuration, control, and other functions of UE 1400, including operations corresponding to, or comprising, any of the exemplary methods described herein. Moreover, program memory 1420 and/or data memory 1430 can include non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed.

Persons of ordinary skill will recognize that processor 1410 can include multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of UE 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1440 can include radio-frequency transmitter and/or receiver functionality that facilitates the UE 1400 to communicate with other equipment supporting like wireless communication standards and/or protocols. In some exemplary embodiments, the radio transceiver 1440 includes one or more transmitters and one or more receivers that enable UE 1400 to communicate according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some exemplary embodiments, radio transceiver 1440 includes one or more transmitters and one or more receivers that can facilitate the UE 1400 to communicate with various LTE, LTE-Advanced (LTE-A), and/or NR networks according to standards promulgated by 3GPP. In some exemplary embodiments of the present disclosure, the radio transceiver 1440 includes circuitry, firmware, etc. necessary for the UE 1400 to communicate with various NR, NR-U, LTE, LTE-A, LTE-LAA, UMTS, and/or GSM/EDGE networks, also according to 3GPP standards. In some embodiments, radio transceiver 1440 can include circuitry supporting D2D communications between UE 1400 and other compatible devices.

In some embodiments, radio transceiver 1440 includes circuitry, firmware, etc. necessary for the UE 1400 to communicate with various CDMA2000 networks, according to 3GPP2 standards. In some embodiments, the radio transceiver 1440 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1440 can include a transceiver that is capable of wired communication, such as by using IEEE 802.3 Ethernet technology. The functionality particular to each of these embodiments can be coupled with and/or controlled by other circuitry in the UE 1400, such as the processor 1410 executing program code stored in program memory 1420 in conjunction with, and/or supported by, data memory 1430.

User interface 1450 can take various forms depending on the particular embodiment of UE 1400, or can be absent from UE 1400 entirely. In some embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1400 having a touch screen display are capable of receiving user inputs, such as inputs related to exemplary methods described herein or otherwise known to persons of ordinary skill.

In some embodiments, UE 1400 can include an orientation sensor, which can be used in various ways by features and functions of UE 1400. For example, the UE 1400 can use outputs of the orientation sensor to determine when a user has changed the physical orientation of the UE 1400's touch screen display. An indication signal from the orientation sensor can be available to any application program executing on the UE 1400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1460 of the UE 1400 can take various forms depending on the particular exemplary embodiment of UE 1400 and of the particular interface requirements of other devices that the UE 1400 is intended to communicate with and/or control. For example, the control interface 1460 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1460 can comprise an IEEE 802.3 Ethernet interface such as described above. In some exemplary embodiments of the present disclosure, the control interface 1460 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1400 can comprise more functionality than is shown in FIG. 14 including, for example, a video and/or still-image camera, microphone, media player and/or recorder, etc. Moreover, radio transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the UE 1400, including any program code corresponding to and/or embodying any exemplary embodiments (e.g., of methods) described herein.

Figure 15:
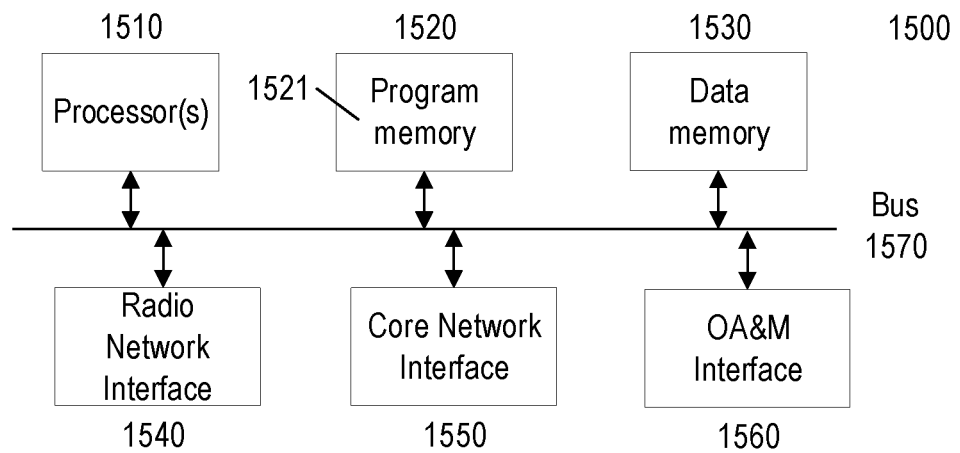
FIG. 15 is a block diagram of an exemplary network node according to various exemplary embodiments of the present disclosure.

FIG. 15 shows a block diagram of an exemplary network node 1500 according to various embodiments of the present disclosure, including those described above with reference to other figures. For example, exemplary network node 1500 can be configured by execution of instructions, stored on a computer-readable medium, to perform operations corresponding to one or more of the exemplary methods described herein. In some exemplary embodiments, network node 1500 can comprise a base station, eNB, gNB, or one or more components thereof. For example, network node 1500 can be configured as a central unit (CU) and one or more distributed units (DUs) according to NR gNB architectures specified by 3GPP. More generally, the functionally of network node 1500 can be distributed across various physical devices and/or functional units, modules, etc.

Network node 1500 can include processor 1510 (also referred to as "processing circuitry") that is operably connected to program memory 1520 and data memory 1530 via bus 1570, which can include parallel address and data buses, serial ports, or other methods and/or structures known to those of ordinary skill in the art.

Program memory 1520 can store software code, programs, and/or instructions (collectively shown as computer program product 1521 in FIG. 15) that, when executed by processor 1510, can configure and/or facilitate network node 1500 to perform various operations, including operations corresponding to various exemplary methods described herein. As part of and/or in addition to such operations, program memory 1520 can also include software code executed by processor 1510 that can configure and/or facilitate network node 1500 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1540 and/or core network interface 1550. By way of example, core network interface 1550 can comprise the S1 or NG interface and radio network interface 1540 can comprise the Uu interface, as standardized by 3GPP. Program memory 1520 can also comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can include multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some embodiments, interface 1540 can also enable network node 1500 to communicate with compatible satellites of a satellite communication network. In some exemplary embodiments, radio network interface 1540 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1540. According to further exemplary embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the S1 interface standardized by 3GPP. In some embodiments, core network interface 1550 can comprise the NG interface standardized by 3GPP. In some exemplary embodiments, core network interface 1550 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1500 can include hardware and/or software that configures and/or facilitates network node 1500 to communicate with other network nodes in a RAN, such as with other eNBs, gNBs, ng-eNBs, en-gNBs, IAB nodes, etc. Such hardware and/or software can be part of radio network interface 1540 and/or core network interface 1550, or it can be a separate functional unit (not shown). For example, such hardware and/or software can configure and/or facilitate network node 1500 to communicate with other RAN nodes via the X2 or Xn interfaces, as standardized by 3GPP.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
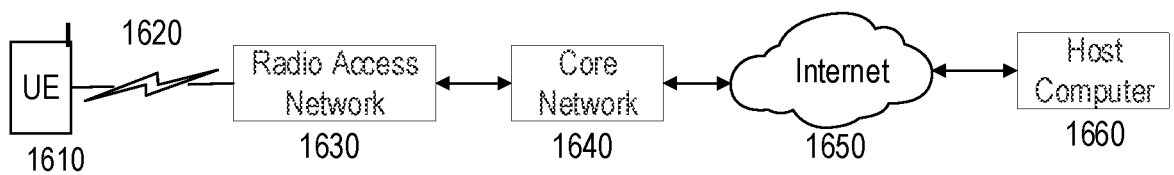
FIG. 16 is a block diagram of an exemplary network configured to provide over-the-top (OTT) data services between a host computer and a UE, according to various exemplary embodiments of the present disclosure.

FIG. 16 is a block diagram of an exemplary communication network configured to provide over-the-top (OTT) data services between a host computer and a user equipment (UE), according to one or more exemplary embodiments of the present disclosure. UE 1610 can communicate with radio access network (RAN) 1630 over radio interface 1620, which can be based on protocols described above including, e.g., LTE, LTE-A, and 5G/NR. For example, UE 1610 can be configured and/or arranged as shown in other figures discussed above.

RAN 1630 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum. In some embodiments, RAN 1630 can include, or be capable of communication with, one or more satellites comprising a satellite access network.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some exemplary embodiments, RAN 1630 and core network 1640 can be configured and/or arranged as shown in other figures discussed above. For example, eNBs comprising an E-UTRAN 1630 can communicate with an EPC core network 1640 via an S1 interface. As another example, gNBs and ng-eNBs comprising an NG-RAN 1630 can communicate with a 5GC core network 1630 via an NG interface.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some exemplary embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide enhanced techniques beam failure recovery when the UE is configured for communication via a plurality of cells, e.g., PCell, PSCell, and one or more SCells. Such embodiments can ensure a maximum duration between when the UE detects beam failure and when the UE finds new beam(s), as well as a maximum duration between when the UE detects beam failure and when the UE determines that it cannot find new beams. Accordingly, ambiguity in UE behavior for the BFD procedure on the SCell is reduced, mitigated, and/or eliminated. Embodiments can mitigate and/or reduce interruptions to UE services due to beam failures. When used in NR UEs (e.g., UE 1610) and gNBs (e.g., gNBs comprising RAN 1630), exemplary embodiments described herein can provide various improvements, benefits, and/or advantages that facilitate and/or improve the use of beams to provide data services (e.g., URLLC). As a consequence, this improves the performance of these services as experienced by OTT service providers and end-users, including more consistent data throughout and lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) configured for communication via a plurality of cells in a wireless network, the method comprising:
   detecting failure of a first beam associated with a first cell of the plurality of cells;
   determining availability of other beams, than the first beam, that are associated with the first cell;
   transmitting, via one of the plurality of cells, a message indicating availability or non-availability of the other beams associated with the first cell, wherein:
      the message is transmitted within a first duration after detecting the failure of the first beam, and
      the first duration is based on a maximum time for determining availability of the other beams and on UE capabilities with respect to beam sharing between the different ones of the plurality of cells.

A2. The method of embodiment A1, wherein the UE capabilities with respect to beam sharing include one or more of the following:
   UE capability to operate using beams shared by the first cell and other ones of the plurality of cells; and
   differences in carrier frequencies between the first cell and other ones of the plurality of cells.

A3. The method of any of embodiments A1-A2, wherein determining availability of other beams comprises:
   measuring signal strengths for the respective other beams;
   determining availability based on a measured signal strength for at least one of the other beams being above a predetermined threshold; and
   determining unavailability based on respective measured signal strengths for all other beams being below the predetermined threshold.

A4. The method of embodiment A3, wherein:
   the method further comprises, upon detecting failure of the first beam, initiating a timer with a maximum time for determining availability of the other beams; and
   determining unavailability is based on expiration of the timer before determining availability of all other beams.

A5. The method of any of embodiments A1-A4, wherein:
   the method further comprises, based on determining availability of other beams, selecting a second beam of the other beams based on signal strength measured by the UE; and
   the message indicates the second beam.

A6. The method of embodiment A5, wherein:
   the first cell is a primary cell (PCell) or a primary secondary cell (PSCell);
   the message is transmitted, via the first cell, as a random-access (RA) preamble using RA resources that correspond to the second beam.

A7. The method of embodiment A6, wherein:
   the method further comprises, based on determining unavailability of other beams, performing a cell reselection procedure to select a third beam of the other beams; and
   the message is transmitted, via the first cell, as RA preamble using RA resources that correspond to the third beam.

A8. The method of embodiment A7, wherein the first duration is further based on periodicity of the RA resources corresponding to the second beam or to the third beam.

A9. The method of embodiment A5, wherein:
   the first cell is a secondary cell (SCell);
   the message is transmitted as medium access control (MAC) message via a cell other than the first cell; and
   the other cell is a primary cell (PCell) or a primary secondary cell (PSCell).

A10. The method of embodiment A9, further comprising:
   transmitting a scheduling request (SR) using resources allocated for beam failure reporting; and
   in response to the SR, receiving a grant of UL resources for transmitting the message.

A11. The method of embodiment A10, wherein the first duration is further based on periodicity of the resources allocated for beam failure reporting.

A12. The method of any of embodiment A6, wherein, based on determining unavailability of other beams, the message indicates that no other beam is available.

A13. The method of any of embodiments A9-A12, further comprising, based on determining unavailability of other beams and after sending the message, refraining from one or more operations with respect to the SCell to reduce at least one of the following: UE energy consumption, and uplink (UL) interference.

A14. The method of embodiment A13, wherein the one or more operations are refrained for a second duration that is configured by the wireless network.

A15. The method of any of embodiments A13-A14, wherein the one or more operations include any of the following:
   monitoring at least one downlink (DL) signal or channel associated with the first cell;
   monitoring all DL signals or channels associated with the first cell;
   transmitting at least one uplink (UL) signal or channel associated with the first cell; and
   transmitting all UL signals or channels associated with the first cell.

B1. A method for communicating with a user equipment (UE) via beams associated with a plurality of cells in a wireless network, the method comprising:
   transmitting a first beam associated with a first cell of the plurality of cells; and
   receiving, from the UE via one of the plurality of cells, a message indicating availability or non-availability of the other beams associated with the first cell, wherein:
      the message is received within a first duration after the UE detects failure of the first beam, and
      the first duration is based on a maximum time for determining availability of the other beams and on UE capabilities with respect to beam sharing between the different ones of the plurality of cells.

B2. The method of embodiment B1, wherein the UE capabilities with respect to beam sharing include one or more of the following:
   UE capability to operate using beams shared by the first cell and other ones of the plurality of cells; and
   differences in carrier frequencies between the first cell and other ones of the plurality of cells.

B3. The method of any of embodiments B1-B2, further comprising configuring the UE with a timer initiation value corresponding to a maximum time for determining availability of other beams after detecting a beam failure.

B4. The method of any of embodiments B1-B3, further comprising configuring the UE with a signal strength threshold for determining availability of the other beams associated with the first cell.

B5. The method of any of embodiments B1-B4, wherein:
the first cell is a primary cell (PCell) or a primary secondary cell (PSCell);
the message indicates a second beam, of the plurality of beams, that was selected by the UE; and
the message is received, via the first cell, as a random-access (RA) preamble using RA resources that correspond to the second beam.

B6. The method of embodiment B5, wherein the first duration is further based on periodicity of the RA resources corresponding to the second beam.

B7. The method of any of embodiments B1-B4, wherein:
the first cell is a secondary cell (SCell);
the message is received as medium access control (MAC) message via a cell other than the first cell; and
the other cell is a primary cell (PCell) or a primary secondary cell (PSCell).

B8. The method of embodiment B7, further comprising:
receiving a scheduling request (SR), from the UE, in resources allocated for beam failure reporting; and
transmitting, to the UE in response to the SR, a grant of UL resources for transmitting the message.

B9. The method of embodiment B8, wherein the first duration is further based on periodicity of the resources allocated for beam failure reporting.

B10. The method of any of embodiments B7-B9, wherein when the message indicates availability of other beams, the message also indicates a second beam, of the plurality of beams, that was selected by the UE.

B11. The method of any of embodiments B7-B9, wherein the message indicates that no other beam is available.

C1. A user equipment (UE) configured for communication via a plurality of cells in a wireless network, the UE comprising:
radio transceiver circuitry configured to communicate with one or more network nodes via the plurality of cells; and
processing circuitry operatively coupled to the radio transceiver circuitry, whereby the processing circuitry and the radio transceiver circuitry are configured to perform operations corresponding to any of the methods of embodiments A1-A15.

C2. A user equipment (UE) configured for communication via a plurality of cells in a wireless network, the UE being further arranged to perform operations corresponding to any of the methods of embodiments A1-A15.

C3. A non-transitory, computer-readable medium storing computer-executable instructions that, when executed by processing circuitry of a user equipment (UE) configured for communication via a plurality of cells in a wireless network, configure the UE to perform operations corresponding to any of the methods of embodiments A1-A15.

C4. A computer program product comprising computer-executable instructions that, when executed by processing circuitry of a user equipment (UE) configured for communication via a plurality of cells in a wireless network, configure the UE to perform operations corresponding to any of the methods of embodiments A1-A15.

D1. A wireless network configured to communicate with a user equipment (UE) via beams associated with a plurality of cells, the wireless network including one or more network nodes comprising:
radio network interface circuitry configured to communicate with the UE via the plurality of cells; and
processing circuitry operatively coupled to the radio network interface circuitry, whereby the processing circuitry and the radio network interface circuitry are configured to perform operations corresponding to any of the methods of embodiments B1-B11.

D2. A wireless network configured to communicate with a user equipment (UE) via beams associated with a plurality of cells, the wireless network including one or more network nodes arranged to perform operations corresponding to any of the methods of embodiments B1-B11.

D3. A non-transitory, computer-readable medium storing computer-executable instructions that, when executed by processing circuitry of one or more network nodes in a wireless network, configure the wireless network to perform operations corresponding to any of the methods of embodiments B1-B11.

D4. A computer program product comprising computer-executable instructions that, when executed by processing circuitry of one or more network nodes in a wireless network, configure the wireless network to perform operations corresponding to any of the methods of embodiments B1-B11.

The invention claimed is:

1. A method for a user equipment (UE) to communicate with a wireless network via a plurality of cells, the method comprising:
detecting failure of a first beam associated with a first cell of the plurality of cells;
determining availability or unavailability of other beams, than the first beam, that are associated with the first cell; and
transmitting, to one of the plurality of cells, a message indicating availability or unavailability of the other beams associated with the first cell, wherein:
the message is transmitted within a first duration after detecting the failure of the first beam, and
the first duration is based on a maximum time for determining availability of the other beams and on a periodicity of resources allocated for beam failure reporting in the cell in which the message is transmitted.

2. The method of claim 1, wherein the first duration is further based on:
UE capabilities to operate using independent or common beams for the first cell and other cells of the plurality of cells; and
differences in carrier frequencies between the first cell and other cells of the plurality of cells.

3. The method of claim 1, wherein determining availability or unavailability of the other beams comprises:
measuring signal strengths for the respective other beams;
determining availability based on a measured signal strength for at least one of the other beams being above a predetermined threshold; and
determining unavailability based on respective measured signal strengths for all of the other beams being below the predetermined threshold.

4. The method of claim 1, wherein:
the method further comprises, upon detecting failure of the first beam, initiating a timer with a maximum time for determining availability of the other beams; and determining availability or unavailability further comprises determining unavailability based on expiration of the timer before determining availability of the other beams.

5. The method of claim 1, wherein:
the method further comprises, based on determining availability of other beams, selecting a second beam of the other beams based on signal strength measured by the UE; and
the message indicates the second beam.

6. The method of claim 5, wherein:
the first cell is a secondary cell (SCell); and
the message is transmitted as medium access control (MAC) message to a primary cell (PCell) or to a primary secondary cell group cell (PSCell).

7. The method of claim 1, further comprising:
transmitting a scheduling request (SR) using resources allocated for beam failure reporting; and
in response to the SR, receiving a grant of uplink resources for transmitting the message.

8. The method of claim 7, wherein the first duration is based on periodicity of the resources allocated for SR associated with beam failure recovery.

9. The method of claim 7, wherein, based on determining unavailability of other beams, the message indicates that no other beam is available.

10. A method for one or more network nodes, in a wireless network, to communicate with a user equipment (UE) via a plurality of cells, the method comprising:
transmitting a first beam associated with a first cell of the plurality of cells; and
receiving, from the UE in one of the plurality of cells, a message indicating availability or unavailability of other beams, than the first beam, that are associated with the first cell, wherein:
the message is received within a first duration after the UE detects failure of the first beam, and
the first duration is based on a maximum time for determining availability of the other beams and on a periodicity of resources allocated for beam failure reporting in the cell in which the message is received.

11. The method of claim 10, wherein the first duration is further based on:
UE capabilities to operate using independent or common beams for the first cell and other cells of the plurality of cells; and
differences in carrier frequencies between the first cell and other cells of the plurality of cells.

12. The method of claim 10, further comprising configuring the UE with one or more of the following:
a timer initiation value corresponding to a maximum time for determining availability of other beams after detecting a beam failure; and
a signal strength threshold for determining availability of other beams after detecting a beam failure.

13. The method of claim 10, wherein:
the first cell is a secondary cell (SCell); and
the message is received as medium access control (MAC) message in a primary cell (PCell) or in a primary secondary cell (PSCell).

14. The method of claim 13, wherein when the message indicates availability of other beams, the message also indicates a second beam, of the plurality of beams, that was selected by the UE.

15. The method of claim 13, wherein the message indicates that no other beam is available.

16. The method of claim 10, further comprising:
receiving a scheduling request (SR) from the UE, in resources allocated for beam failure reporting; and
transmitting, to the UE in response to the SR, a grant of uplink resources for transmitting the message.

17. The method of claim 16, wherein the first duration is based on periodicity of the resources allocated for SR associated with beam failure recovery.

18. A user equipment (UE) configured to communicate with a wireless network via a plurality of cells, the UE comprising:
radio transceiver circuitry configured to communicate with one or more network nodes via the plurality of cells; and
processing circuitry operatively coupled to the radio transceiver circuitry, whereby the processing circuitry and the radio transceiver circuitry are configured to:
detect failure of a first beam associated with a first cell of the plurality of cells;
determine availability or unavailability of other beams, than the first beam, that are associated with the first cell; and
transmit, to one of the plurality of cells, a message indicating availability or unavailability of the other beams associated with the first cell, wherein:
the message is transmitted within a first duration after detecting the failure of the first beam, and
the first duration is based on a maximum time for determining availability of the other beams and on a periodicity of resources allocated for beam failure reporting in the cell in which the message is transmitted.

19. The UE of claim 18, wherein the first duration is further based on:
UE capabilities to operate using independent or common beams for the first cell and other cells of the plurality of cells; and
differences in carrier frequencies between the first cell and other cells of the plurality of cells.

20. The UE of claim 18, wherein:
the processing circuitry and the radio transceiver circuitry are further configured to, based on determining availability of other beams, select a second beam of the other beams based on signal strength measured by the UE; and
the message also indicates the second beam.

21. A wireless network comprising one or more network nodes configured to communicate with a user equipment (UE) via a plurality of cells, the one or more network nodes comprising:
radio network interface circuitry configured to communicate with the UE via the plurality of cells; and
processing circuitry operatively coupled to the radio network interface circuitry, whereby the processing circuitry and the radio network interface circuitry are configured to perform operations corresponding to the method of claim 10.

* * * * *